(12) United States Patent
Da Silva et al.

(10) Patent No.: US 9,344,945 B2
(45) Date of Patent: May 17, 2016

(54) METHODS FOR COORDINATING INTER-RAT MOBILITY SETTINGS

(71) Applicant: Telefonaktiebolaget L M Ericsson (publ), Sweden (SE)

(72) Inventors: Icaro L. J. Da Silva, Sollentuna (SE); Angelo Centonza, Winchester (GB); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 182 days.

(21) Appl. No.: 14/069,704

(22) Filed: Nov. 1, 2013

(65) Prior Publication Data

US 2014/0128075 A1 May 8, 2014

Related U.S. Application Data

(60) Provisional application No. 61/721,586, filed on Nov. 2, 2012.

(51) Int. Cl.
*H04W 36/30* (2009.01)
*H04W 36/00* (2009.01)
*H04W 36/14* (2009.01)

(52) U.S. Cl.
CPC .......... *H04W 36/30* (2013.01); *H04W 36/0083* (2013.01); *H04W 36/0066* (2013.01); *H04W 36/14* (2013.01)

(58) Field of Classification Search
None
See application file for complete search history.

(56) References Cited

U.S. PATENT DOCUMENTS

2003/0139184 A1* 7/2003 Singh et al. ............ 455/436
2011/0026492 A1* 2/2011 Frenger et al. .......... 370/331
(Continued)

FOREIGN PATENT DOCUMENTS

EP 2403296 A1 1/2012
GB 2472596 A 2/2011
WO 2011131225 A1 10/2011

OTHER PUBLICATIONS

Ericsson: "Inter RAT MRO coordination," 3GPP Draft; R3-122298 I RAT_MRO_SIGNALLING, 3rd Generation Partnership Project (3GPP), Mobile Competence Centre: 650, Route Des Lucioles; F-06921 Sophia-Antipolis Cedex; France, vol. RAN WG3, Sep. 29, 2012, 2 pages.

(Continued)

*Primary Examiner* — Ashish K Thomas
(74) *Attorney, Agent, or Firm* — Rothwell, Figg, Ernst & Manbeck, p.c.

(57) ABSTRACT

A system, method, and apparatus are presented for coordinating handover. A first controller that is associated with a first RAN cell determines a first handover parameter value that is for use in determining whether to cause handover from the first RAN cell to a second RAN cell having a different RAT. The first controller transmits, to a second controller associated with the second RAN cell, information relating to the first handover parameter value. The first controller further transmits, to the second controller, a value of a QoS parameter or a UE capability parameter associated with the information. The first controller receives, from the second controller, an indication of whether the second controller has adjusted a second handover parameter value based on the transmitted information, where the second handover parameter value is for use in determining whether to cause handover from the second RAN cell to the first RAN cell.

29 Claims, 18 Drawing Sheets

(56) References Cited

U.S. PATENT DOCUMENTS

| | | | |
|---|---|---|---|
| 2012/0135739 A1* | 5/2012 | Paterson | 455/436 |
| 2012/0195238 A1* | 8/2012 | Li | 370/280 |
| 2014/0031036 A1* | 1/2014 | Koo et al. | 455/434 |
| 2014/0171083 A1* | 6/2014 | Zhang et al. | 455/436 |
| 2014/0200003 A1* | 7/2014 | Kodali et al. | 455/436 |
| 2015/0031308 A1* | 1/2015 | Schmidt et al. | 455/67.11 |

OTHER PUBLICATIONS

European International Search Report and Written Opinion mailed Mar. 20, 2014, International Application No. PCT/IB2013/059844, International Filing Date: Nov. 1, 2013, Applicant: Telefonaktiebolaget L M Ericsson (Publ), 15 pages.

* cited by examiner

METHODS FOR COORDINATING INTER-RAT MOBILITY SETTINGS

CROSS-REFERENCE TO RELATED APPLICATIONS

This application claims priority to U.S. Provisional Application No. 61/721,586, filed on Nov. 2, 2012 and entitled "Enhancements on Inter-RAT Mobility Setting Coordination," the entire content of which is incorporated by reference herein.

TECHNICAL FIELD

This disclosure relates to systems, methods, apparatus, and computer program products for coordinating inter-RAT mobility settings.

BACKGROUND

User equipment (UE) mobility between different radio access technologies (RATs) may be accomplished by inter-RAT (IRAT) handover from a cell that uses one RAT (e.g., UTRAN) to a cell that uses another RAT (e.g., e-UTRAN). Handover can be triggered by mobility events, such as an event in which the quality of a reference signal in the UE's current cell or a reference signal in the target cell satisfies certain conditions.

For e-UTRAN, the signal quality may be indicated by one or more of a reference signal received power (RSRP), a reference signal received quality (RSRQ), and any other signal quality parameter. For UTRAN, the signal quality may be indicated by one or more of a received signal code power (RSCP), a received signal strength indicator (RSSI), EcNo (i.e., RSCP/RSSI), and any other signal quality parameter.

Handover from an e-UTRAN cell and a UTRAN cell may be triggered when a mobility event called B2 occurs. Event B2 occurs when the signal quality satisfies two conditions, B2-1 and B2-2:

Condition B2-1 is satisfied when $M_p+Hys<Thresh1=B2\_1$.

Condition B2-2 is satisfied when $M_n+Ofn-Hys>Thresh2=B2\_2$ $M_p$ refers to a measurement of a signal (e.g., a reference signal) from the serving cell (i.e., the e-UTRAN cell), and may be expressed in dBm in case of RSRP or in dB in case of RSRQ. $M_n$ refers to a measurement of a signal (e.g., a reference signal) from a target cell (i.e., the UTRAN cell). Hys refers to a hysteresis parameter. Ofn is a frequency-specific offset of a frequency of a neighboring cell.

The conditions indicate that a handover from e-UTRAN to UTRAN is triggered when signal quality in the e-UTRAN cell becomes worse than the threshold $B2\_1$ and signal quality in the UTRAN cell becomes better than the threshold $B2\_2$. Event B2 is discussed in more detail in TS 36.331. Handover from e-UTRAN to UTRAN may also be triggered by an event named "B1", which occurs when a B1-b is fulfilled:

Condition B1-b is satisfied when $M_n+Ofn-Hys>Thresh=B1\_b$.

Handover in the other direction, from UTRAN to e-UTRAN, may be triggered by a mobility event called "3A" or a mobility event called "3C". Event 3A occurs when two conditions, 3A-1 and 3A-2, are satisfied:

Condition 3A-1 is satisfied when $Q_{Used}+H3a/2<T_{Used}=3A\_a$.

Condition 3A-2 is satisfied when $M_{OtherRAT}+CIO_{OtherRAT}-H3a/2>T_{OtherRAT}=3A\_b$.

The parameters are discussed in more detail in TS 25.331. The threshold $3A\_a$ may also be referred to as $3A\_1$, and the threshold $3A\_b$ may also be referred to as $3A\_2$. Event 3C is considered to occur when a single condition is fulfilled: $M_{OtherRAT}+CIO_{OtherRAT}\geq T_{OtherRAT}+H_{3c}/2$. Events 3A and 3C generally represent a situation in which signal quality in the UTRAN cell becomes worse than the threshold $3A\_1$ and signal quality in the e-UTRAN cell becomes better than the threshold $3A\_2$.

While this disclosure refers to events B1 and B2 as triggering a threshold, more generally the events are for use in determining whether to cause a handover to occur. That is, each event may trigger a reporting of signal measurements from a UE to a base station of the UE's serving cell. A controller (e.g., eNB, NB, or RNC) of the serving cell may use the measurements to determine whether to cause a handover from the serving cell to another cell.

SUMMARY

A system, method, and apparatus are presented for coordinating handover optimization, such as for handover between different radio access technologies (RATs). In an embodiment, a controller of a first radio access network (RAN) (the "first controller") determines a first handover parameter value for use in determining whether to cause handover from the first RAN cell to a second RAN cell having a different radio access technology (RAT) than the first RAN cell.

The first controller transmits, to a controller of the second RAN cell (the "second controller"), information relating to the first handover parameter value.

The first controller further transmits to the second controller a value of a quality of service (QoS) parameter or a user equipment (UE) capability parameter associated with the information relating to the first handover parameter value. The QoS parameter indicates a level of service provided to or expected by a user equipment (UE) being served by the first RAN cell or the second RAN cell. The UE capability parameter indicates UE capability. In an embodiment, the information relating to the first handover parameter value and the value of the QoS parameter or UE capability parameter are sent as part of one RAN information management (RIM) message.

The first controller receives from the second controller an indication of whether the second controller has adjusted a second handover parameter value based on the transmitted information. The second handover parameter value is for use in determining whether to cause a handover from the second RAN cell to the first RAN cell.

In an embodiment, the first handover parameter value is a first handover threshold value that is used to determine whether a handover condition has been met, and the second handover parameter value is a second handover threshold value that is used to determine whether a handover condition has been met.

In an embodiment, the first controller determines an adjustment of the second handover threshold value based on the first handover threshold value. In the embodiment, the transmitted information includes the adjustment of the second handover threshold value, and the received indication includes an indication of whether the second controller accepts the adjustment of the second handover threshold value.

In an embodiment, the transmitted information includes the first handover threshold value, and the received indication includes an indication of whether the second controller made an adjustment of the second handover threshold value based on the first handover threshold value.

DETAILED DESCRIPTION

The present disclosure is concerned with improving mobility robustness by using handover to reduce radio link failures (RLFs) while also avoiding excessive number of back-and-forth handovers between radio access networks (RANs) having different radio access technologies (RATs). More particularly, the disclosure involves coordinating the adjustment of mobility settings (e.g., handover parameters) between two or more RANs having different RATs. In a more specific instance, the present disclosure addresses improving "ping-pong" avoidance in Mobility Load Balance scenarios.

Figure 1:
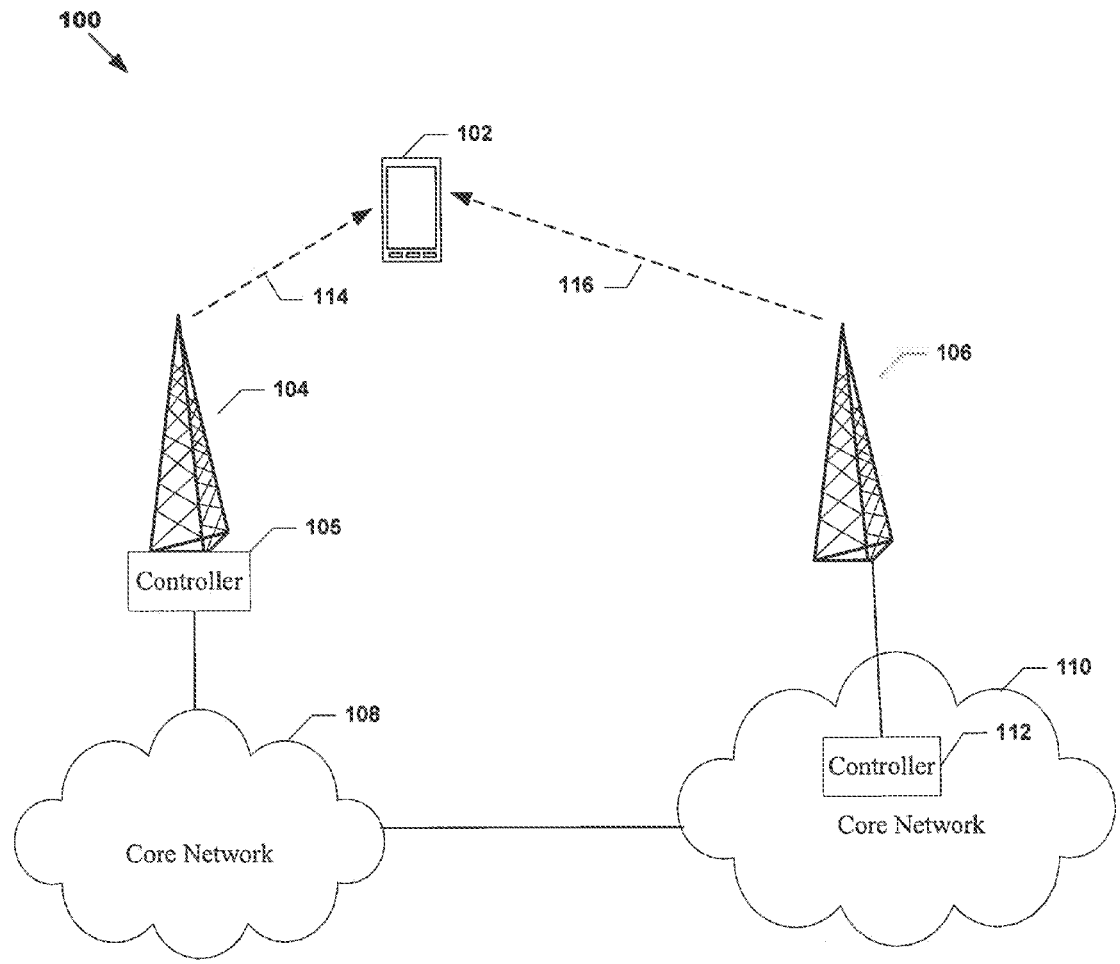
FIG. 1 illustrates a number of nodes in a system for coordinating handover.

FIG. 1 illustrates an example system 100 for coordinating handover of a UE 102 between a cell provided by base station 104 and another cell provided by a base station 106. In an embodiment, base station 104 and base station 106 use different RATs. For instance, base station 104 is an eNB that provides an e-UTRAN cell for LTE, while base station 106 is a NB that provides a UTRAN cell for UMTS or is a base station that implements a GERAN cell for GSM. The handover may be based on measurements that the UE 102 makes of a signal 114 from the RAN cell of base station 104 (e.g., an e-UTRAN reference signal) and/or of a signal 116 from the RAN cell of base station 106 (e.g., a UTRAN reference signal). For instance, when one or more measured values satisfy certain conditions, such as meeting certain thresholds, a handover event may be triggered. The handover event causes the UE to report the measurement to the base station of its serving cell. A controller of the serving cell may then decide that the UE should be handed over from the serving RAN cell to a target RAN cell.

The conditions that trigger a mobility event (i.e., a handover event) from a serving RAN cell to a target RAN cell may be set by the serving RAN cell. For instance, the controller 105 may set a handover parameter value (e.g., handover threshold value) that defines the condition that triggers a handover from the RAN cell provided by base station 104 to another cell (i.e., the handover parameter is used to determine whether such a handover should occur). More generally speaking, the UE may periodically generate a calculated value (e.g., $M_p$+Hys), and if the calculated value exceeds the handover threshold value (e.g., falls below B2_1), the UE reports signal measurements (e.g., $M_p$) to controller 105, which uses the report to determine whether to cause a handover of the UE to another cell. In determining whether to cause the handover, the controller 105 may consider, for instance, the signal measurements with respect to the handover threshold value, a mobility load balance function, or any combination thereof.

Similarly, the controller 112 may set a handover parameter value (e.g., a handover threshold value) that is for use in determining whether to cause handover, such as a value that defines a condition that triggers a handover from the RAN cell provided by base station 106 to another cell. Each controller may communicate the thresholds to the UE, which uses them to detect handover events. More generally speaking, the UE may periodically generate a calculated value (e.g., $M_{OtherRAT}+CIO_{OtherRAT}-H3a/2$), and if the calculated value exceeds the handover threshold value (e.g., rises above 3A_2), the UE reports signal measurements (e.g., $M_{OtherRAT}$) to the controller 112, which uses the report to determine whether to cause a handover of the UE to another cell. In determining whether to cause the handover, the controller 112 may consider, for instance, the signal measurements with respect to the handover threshold value, a mobility load balance function, or any combination thereof. In some cases, if the base station 106 is a NB, then the controller 112 is a radio network controller (RNC). In an embodiment, the controller of base station 104 may be part of the base station 104 (e.g., part of an eNB), and/or may be a network node (e.g., MME node).

The controllers 105, 112 may coordinate handover information, such as the adjustment of mobility settings, by communicating the information through their core networks 108, 110. The mobility settings may include one or more parameters for identifying whether a handover event has occurred (i.e., one or more handover parameters), such as one or more handover thresholds. In an embodiment, the coordination involves the communication of the one or more handover thresholds, such as the threshold B2_1 or 3A_2. The communication of such thresholds is discussed in more detail below.

The handover thresholds may control how much signal quality in a serving RAN cell has to deteriorate and/or how good signal quality in a target RAN cell has to be to trigger a handover. Deterioration of signal quality in the UE's serving cell, such as caused by the UE moving farther away from the cell's base station, may eventually lead to a radio link failure (RLF) unless the UE is handed over to the target cell.

Figure 2A:
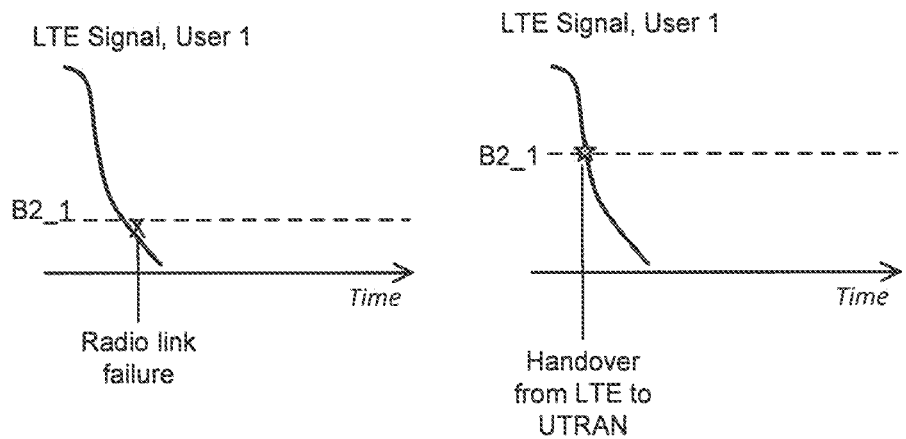
FIGS. 2A-2B illustrate signal diagrams related to handover threshold values.

Adjusting mobility settings, such as handover thresholds, may reduce the occurrence of RLFs. FIG. 2A illustrates an instance in which the handover threshold B2_1 is adjusted. The threshold reflects signal quality in a e-UTRAN cell, and is used to trigger a handover from the e-UTRAN cell to the UTRAN cell. Although such a handover event also depends on the threshold B2_2, which is associated with signal quality in a target UTRAN cell, this embodiment assumes that UTRAN coverage is sufficiently ubiquitous such that its signal quality will generally support a handover. Thus, this embodiment addresses only the signal quality in the e-UTRAN cell and the threshold B2_1. Other embodiments may take the UTRAN signal quality into account as well.

FIG. 2A illustrates a case, referred to as User Case 1, in which RLF occurs while the UE is being served by the e-UTRAN cell, or during handover from the e-UTRAN cell to the UTRAN cell. The failure may occur during handover if, for example, the RLF conditions occur immediately after handover is initiated. In the example, the handover may fail to successfully complete.

One way to reduce the occurrence of RLF in User Case 1 is to relax a handover threshold that triggers handover from the e-UTRAN cell to the UTRAN cell. For instance, FIG. 2A shows that RLFs are more likely to occur when the threshold B2_1 is low. The likelihood of RLFs can be reduced by relaxing the threshold for handovers, and more specifically by raising B2_1. The increased threshold makes it more likely that a UE is handed over to a UTRAN cell before signal quality in the e-UTRAN cell deteriorates to the point of RLF.

Figure 2B:
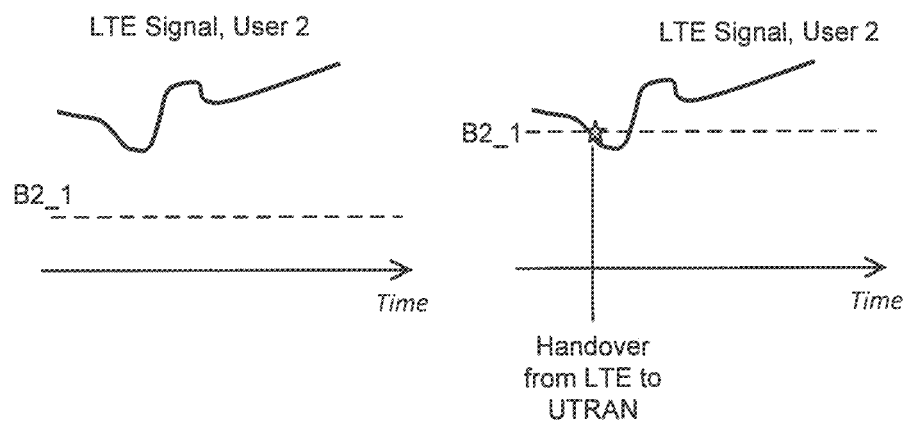

While a controller of the e-UTRAN cell may increase B2_1 to reduce the occurrence of RLF, it may also decrease B2_1 to avoid an excessive number of handovers. That is, a side effect of relaxing a handover threshold like B2_1 (or of any other handover parameter) is that the relaxed threshold may increase the likelihood unnecessary handovers. For instance, FIG. 2B illustrates a UE that experiences better signal quality than that in FIG. 2A, making handover unnecessary in that instance. The UE may experience better signal quality compared to that in FIG. 2A because it is at a different location, it is experiencing the signal quality at a different time (e.g., on a different day), or for some other reason. As shown in FIG. 2B, the increased B2_1 threshold triggers an unnecessary handover.

Thus, a handover threshold may be adjusted to balance the tradeoff between reducing the likelihood of RLF and reducing the likelihood of unnecessary handovers. An inter-RAT mobility robustness optimization (IRAT MRO) function in a RAN controller may takes this tradeoff into account to adjust handover thresholds. As specified in TS 48.017, TS 48.018, TS 36.413, and TS 25.413, RLF reports may be generated to collect statistics about handovers that came too late or about unnecessary handovers. The statistics may be used to adjust handover thresholds.

Figure 3A:
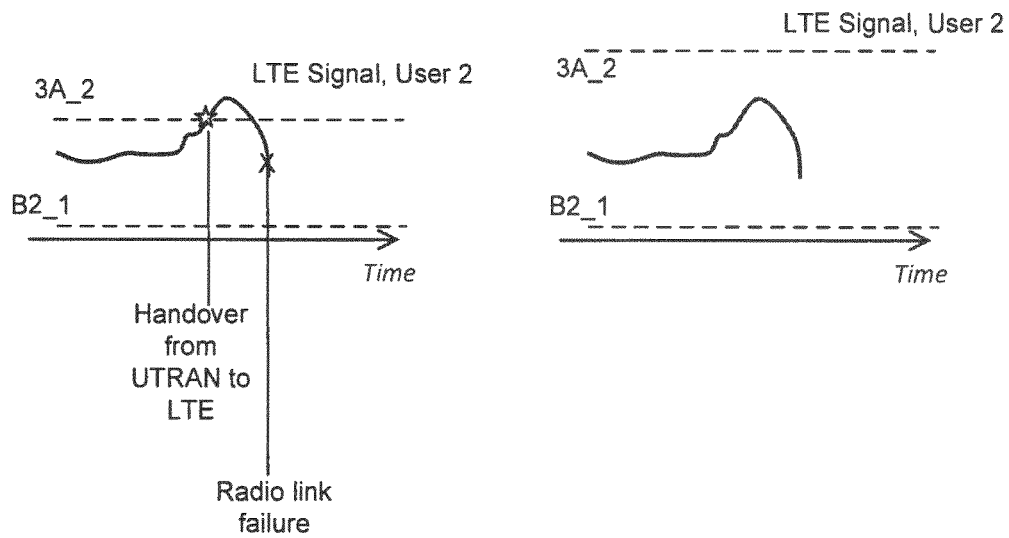
FIGS. 3A-3B illustrate signal diagrams related to handover threshold values.
Figure 3B:
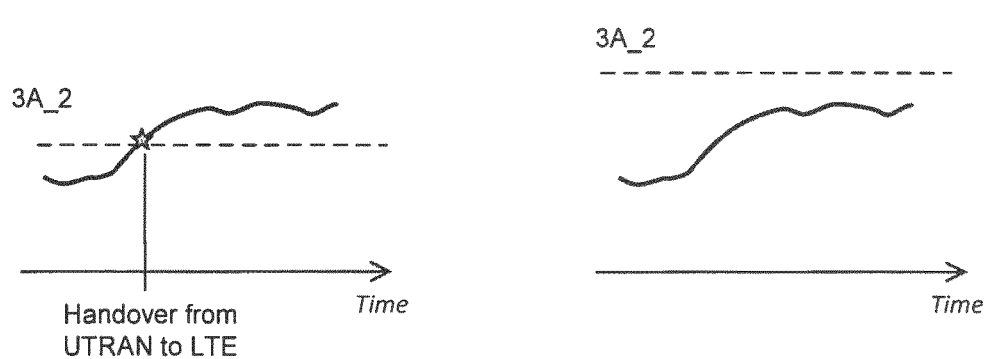

The tradeoff is also illustrated in FIGS. 3A-3B in the case of handover from UTRAN to e-UTRAN. The figures show the adjustment of the threshold 3A_2, which indicates signal quality in a target e-UTRAN cell. Although the handover event 3A also depends on the threshold 3A_1, which indicates signal quality in the serving UTRAN cell, this embodiment assumes that UTRAN coverage is sufficiently ubiquitous such that handover occurs not because UTRAN signal quality is poor, but rather because e-UTRAN is preferred over UTRAN, and signal quality in the e-UTRAN cell supports handover. Other embodiments may take the UTRAN signal quality into account as well.

FIG. 3A illustrates RLF in a case called User Case 2. The figure shows that signal quality in a target e-UTRAN cell will deteriorate to a point that does not support handover. However, because the threshold 3A_2 is set too low, a brief improvement in the signal quality triggers a handover from the serving UTRAN cell to the e-UTRAN cell. After the handover, the signal quality in the e-UTRAN cell resumes its deterioration, leading to the RLF. The RLF in user case 2 may be counteracted by making the handover threshold (or any other handover parameter) more stringent, such as by increasing the threshold 3A_2. As further shown in FIG. 2A, the increased threshold 3A_2 ensures that a UE stays in UTRAN, and thus reducing the likelihood of RLF.

However, making the handover parameter more stringent also creates a lost opportunity for handover from UTRAN to e-UTRAN. As shown in FIG. 3B shows, if signal quality in the e-UTRAN cell is sufficient to support handover, raising the threshold value of 3A_2 nevertheless prevents the handover. This unnecessarily prolongs the time that the UE spends in UTRAN and shrinks LTE coverage.

A controller of the UTRAN cell may also implement an IRAT MRO function to adjust the 3A_2 threshold to balance the tradeoff between decreasing the likelihood of RLFs and avoiding lost opportunities for handovers. The adjustment may be based on collected statistics of RLFs.

However, applying a single adjusted threshold value of B2_1 or 3A_2 (or of any other handover threshold value) to a RAN cell may not be optimal, because the tradeoffs discussed above may be balanced differently for different UEs or different applications running on a UE. For instance, different applications have different levels of susceptibility to RLFs or to excessive handovers. A UE application that provides a real-time service (e.g., a video chat application) may be more sensitive to RLFs than a UE application that provides a non-real-time service (e.g., a file transfer application). Thus, the real-time UE application may be less tolerant of RLFs but more tolerant of excessive handovers or prolonged time in UTRAN. The non-real-time UE application, on the other hand, may be more tolerant of RLFs but less tolerant of excessive handovers or prolonged time in UTRAN because the latter situations reduces throughput.

In an embodiment, the real-time UE application and the non-real-time UE application may be differentiated based on various criteria. The differentiation criteria may include the quality of service (QoS) associated with each application or a capability of the UE. Thus, in an embodiment, different handover parameter values (e.g., different handover threshold values) may apply to specific values of specific (QoS) parameters and/or specific values of specific UE capability parameters.

Figure 4:
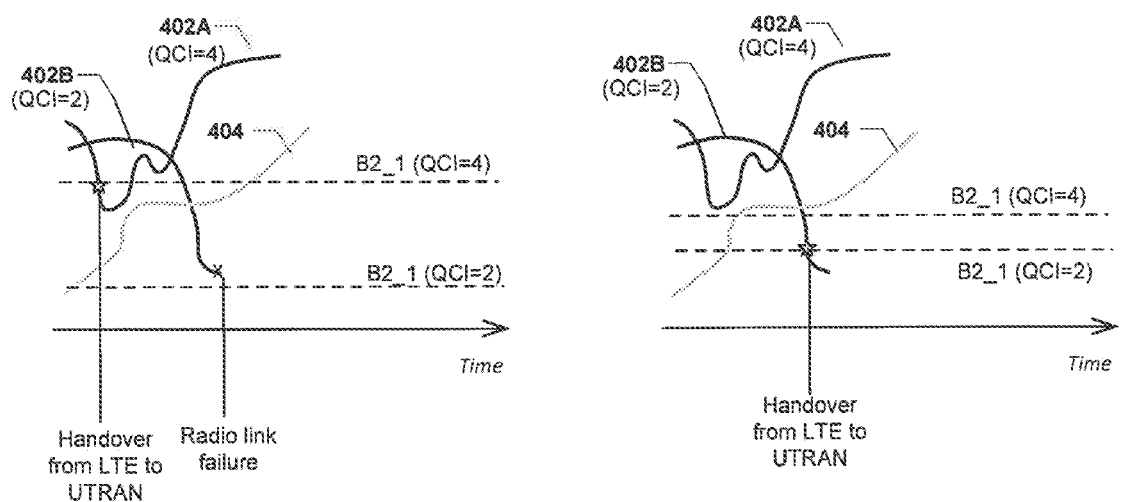
FIG. 4 illustrates signal diagrams related to handover threshold values.

The QoS parameters may be associated with signal bearers carrying data for applications running on the UE. For example, the QoS parameter includes a QoS class indicator (QCI), and different handover thresholds may apply based on what QCI value is assigned to a particular signal bearer carrying data for the UE. FIG. 4 illustrates two different adjustments to the handover threshold B2_1 based on two different QCI values. In the example, the two different adjustments may be applied to same UE. For instance, a real-time application running on the UE may transfer data with a signal bearer that has a QCI of 4, while a non-real-time application running on that UE may transfer data with a signal bearer that has a QCI of 2.

The application associated with the QCI value of 2 may be less tolerant of RLF, but more tolerant of excessive handovers. Thus, the handover threshold B2_1 may be increased decrease the likelihood of RLF. If the UE application later experiences deteriorating signal quality, such as that represented by signal 402B, the increased threshold of B2_1 may trigger a handover to avoid the RLF.

The application associated with a QCI value of 4 may be more tolerant of RLF, but less tolerant of excessive handovers. For instance, a file transfer application that experiences RLF in a e-UTRAN cell may simply re-establish a radio connection with the e-UTRAN cell and resume the file transfer. Excessive handovers, however, may slow the file transfer rate for the application. Thus, as illustrated in FIG. 4, the handover threshold B2_1 is lowered for the application with a signal bearer of QCI=4, so as to decrease the likelihood of handover.

The UE capability parameter may include, for example, one or more of: a UE category, a UE radio resource management (RRM) configuration (e.g., a DRX configuration), a subscription type of the UE, terminal model of the UE, and a velocity of the UE (e.g., low velocity or high velocity).

Figure 5:
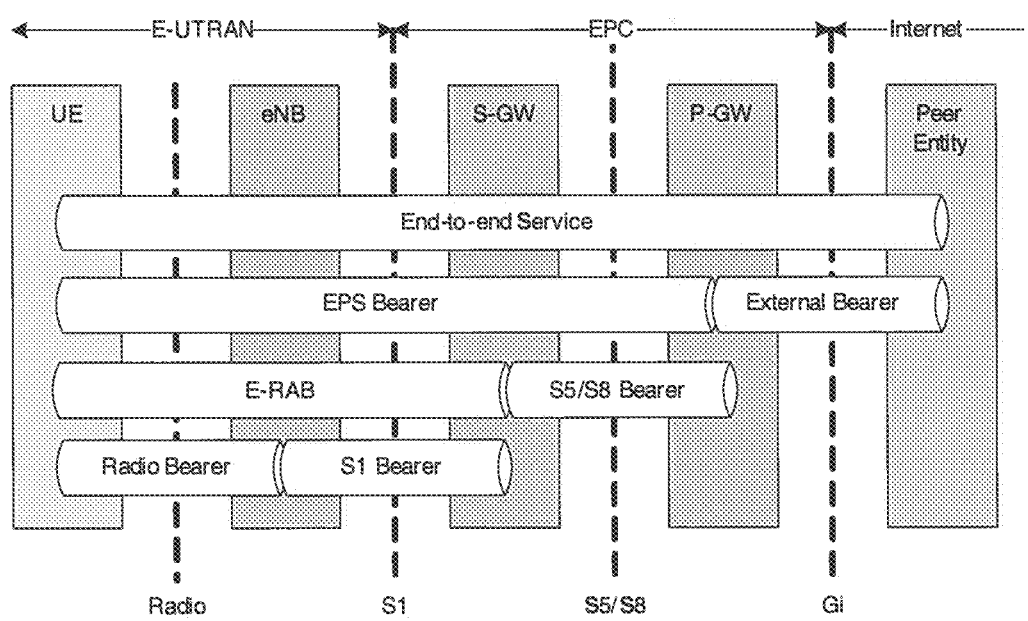
FIG. 5 illustrates various signal bearers for carrying UE data

FIG. 5 illustrates various signal bearers with which a QoS parameter such as QCI may be associated. A UE can have multiple applications (for example, VoIP, browsing, file download) running at the same time, each having a different QoS requirement. In order to support these different requirements, different signal bearers are set up, each being associated with a QoS parameter value. An EPS bearer/E-RAB (Radio Access Bearer) is the level of granularity for bearer level QoS control in the EPC/e-UTRAN. That is, Service Data Flows (SDF) mapped to the same EPS bearer receive the same bearer level packet forwarding treatment (e.g. scheduling policy, queue management policy, rate shaping policy, RLC configuration, etc.).

An EPS bearer/E-RAB is referred to as a GBR bearer if dedicated network resources related to a Guaranteed Bit Rate (GBR) value associated with the EPS bearer/E-RAB are permanently allocated (e.g. by an admission control function in a eNB) at bearer establishment/modification. Otherwise, an EPS bearer/E-RAB is referred to as a Non-GBR bearer. A dedicated bearer can either be a GBR or a Non-GBR bearer while a default bearer shall be a Non-GBR bearer.

As shown in FIG. 5, the packets of an EPS bearer are transported over a radio bearer between the UE and eNB. An S1 bearer transports the packets of an EPS bearer between the eNB and S-GW. An E-RAB is actually a concatenation of these two bearers (i.e. radio bearer and S1 bearer), and the two bearers are mapped on a one to one fashion. An S5/S8 bearer transports the packets of the EPS bearer between the serving gateway (S-GW) and packet data network gateway (P-GW), and completes the EPS bearer.

As stated above, QoS parameters for a bearer include one or more of QCI, ARP, GBR, AMBR, and any other indication of bearer service (e.g., whether the bearer is for a real-time service or a non-real-time service):

QoS Class Identifier (QCI): scalar value that is used as a reference to access node-specific parameters that control bearer level packet forwarding treatment (e.g. scheduling weights, admission thresholds, queue management thresholds, link layer protocol configuration, etc.), and that have been pre-configured by the operator owning the eNodeB. In an embodiment, nine QCI values are standardized the detailed requirements of these classes can be found in 3GPP TS 23.203.

Allocation and Retention Priority (ARP): the primary purpose of ARP is to decide whether a bearer establishment/modification request can be accepted or needs to be rejected in case of resource limitations. In addition, the ARP can be used by the eNodeB to decide which bearer(s) to drop during exceptional resource limitations (e.g. at handover).

Guaranteed Bit Rate (GBR) (associated with GBR bearers): the bit rate that can be expected to be provided by a GBR bearer Maximum Bit Rate (MBR) (associated with GBR bearers): the maximum bit rate that can be expected to be provided by a GBR bearer. MBR can be greater or equal to the GBR.

In an embodiment, for each APN access, by a UE, is associated with a per-APN Aggregate Maximum Bit Rate (APN-AMBR). The APN-AMBR sets the limit on the aggregate bit rate that can be expected to be provided across all Non-GBR bearers and across all PDN connections of the same APN.

In an embodiment, each UE in state EMM-REGISTERED is associated with the bearer aggregate level QoS parameter known as per UE Aggregate Maximum Bit Rate (UE-AMBR). The UE-AMBR limits the aggregate bit rate that can be expected to be provided across all Non-GBR bearers of a UE.

While the discussion above related to QoS parameters and UE capability parameters, the differentiation criteria may include any other parameter that differentiates between different levels of susceptibility to RLFs, excessive handovers, and/or prolonged time in a less preferred RAN.

As discussed above, the adjustment of handover conditions (e.g., handover thresholds), can be coordinated between a source RAN cell and a target RAN cell. The coordination may be used to avoid a "ping-pong" effect in which excessive number of handovers occur, and to avoid a shrinkage of coverage (e.g., LTE coverage), in a UE spends a prolonged time in the source RAN cell (e.g., in the UTRAN cell).

Figure 6A:
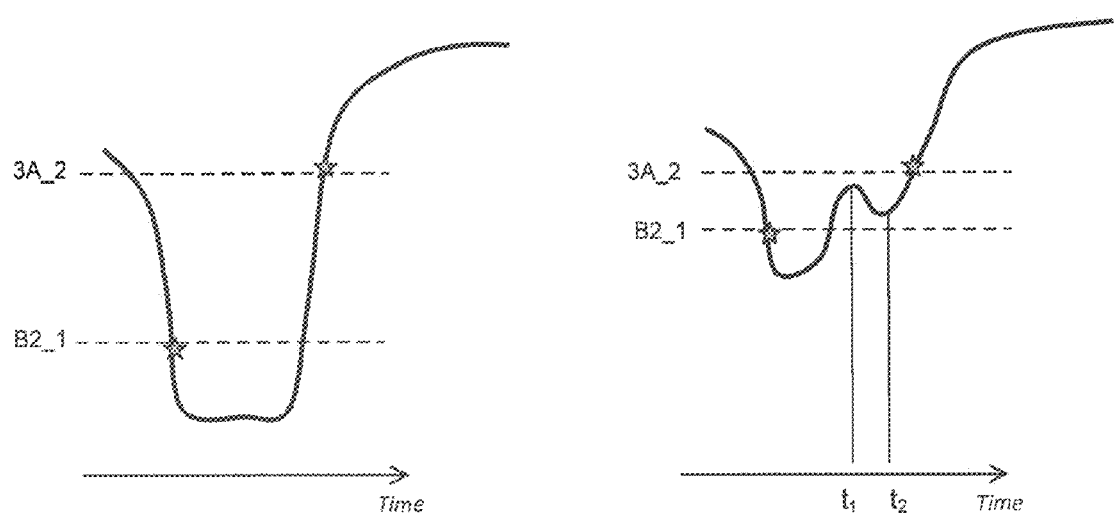
FIGS. 6A-6B illustrate signal diagrams related to handover threshold values.
Figure 6B:
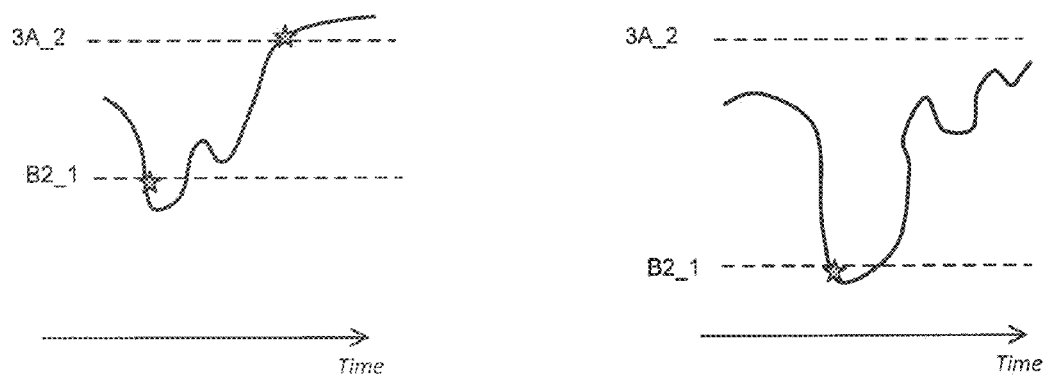

FIGS. 6A-6B illustrate the "ping pong" and shrinkage situations, respectively. In both figures, an e-UTRAN cell's controller adjusts a threshold (e.g., $B2\_1$) that triggers handover from the e-UTRAN cell to a UTRAN cell. However, the e-UTRAN cell's controller fails to coordinate with a controller of the UTRAN cell regarding the threshold value that would trigger a handover in the other direction (e.g., $3A\_2$). As a result, the gap between the thresholds $B2\_1$ and $3A\_2$ is decreased. This decreased gap increases the likelihood that the UE will "ping pong" between being handed over to UTRAN and handed back to e-UTRAN. For example, FIG. 6A illustrates that, at time $t_1$, the signal quality is close to triggering a handover from the UTRAN cell to the e-UTRAN cell, while at time $t_2$, the signal quality is close to triggering a handover from the e-UTRAN cell to the UTRAN cell.

FIG. 6B illustrates a situation where the e-UTRAN cell's controller decreases the threshold $B2\_1$ used to trigger a handover to UTRAN, but the UTRAN cell's controller continues to use the same threshold $3A\_2$ for triggering a handover back to e-UTRAN, thus increasing the gap between $B2\_1$ and $3A\_2$. As the figure shows, a high value of $3A\_2$ may prolong the time that a signal spends in the UTRAN cell.

Table 1 below summarizes the effect of adjusting a handover condition for one RAN cell without a corresponding adjustment in another RAN cell, such as an adjustment of only a $B2\_1$ threshold for an e-UTRAN cell or only the $3A\_2$ threshold for a UTRAN cell.

TABLE 1

| Effect of adjusting only $B2\_1$ or only $3A\_2$ | | |
|---|---|---|
| | Only $B2\_1$ | Only $3A\_2$ |
| Increase | May cause ping-pong or short unnecessary handovers | May shrink the LTE coverage, causing UE to stay longer than necessary in UTRAN |
| Decrease | May shrink the LTE coverage, causing UE to stay longer than necessary in UTRAN | May cause ping-pong or short unnecessary handovers |

Thus, in an embodiment, if the controller of the e-UTRAN cell ("e-UTRAN controller") makes an adjustment or is going to make an adjustment to the threshold $B2\_1$, it may attempt to coordinate with the controller of the UTRAN cell ("UTRAN controller") so that the UTRAN controller can make a corresponding adjustment to the threshold $3A\_1$. For instance, if the e-UTRAN controller increases $B2\_1$, the coordination may cause the UTRAN controller to increase $3A\_1$, so as to maintain the gap between the two thresholds to reduce the "ping pong" or shrinkage effects. The coordination may be accomplished by having one RAN cell communicate the $B2\_1$ threshold or $3A\_2$ threshold to the other RAN cell.

For instance, the e-UTRAN controller may run an IRAT MRO function to adjust the threshold B2_1 based on RLF characteristics. To coordinate this adjustment with a neighboring UTRAN controller, it may calculate a corresponding adjustment to the 3A_2 threshold, and transmit the adjusted value of 3A_2 as a recommendation to the UTRAN controller. The UTRAN controller may adopt this adjusted 3A_2 value, thus keeping a gap between B2_1 and 3A_2 to within a desired amount. More details on the communication of a single threshold value from one controller to another controller may be found in PCT Application No. PCT/SE2013/050247, entitled "Inter-RAT Coordination of Mobility Settings," filed Apr. 16, 2013, the entire contents of which is incorporated herein by reference.

In an embodiment, the coordination may be triggered by an IRAT Mobility Load Balancing (MLB) function. If a RAN cell is approaching a maximum capacity, it may attempt to perform load balancing by relaxing a condition under which a UE can be handed over out of the cell, and/or make more stringent a condition under which a UE can be handed over into the cell. In an embodiment, if a controller of a first RAN cell (the first controller) calculates a first handover parameter value (which is for use in determine whether to cause handover from the first RAN cell to a second RAN cell), the first controller may transmit information relating to the first handover parameter value, along with an associated QoS parameter value or UE capability parameter value, to a controller of the second RAN cell (the second controller). In one instance, the information may include a calculated adjustment to a second handover parameter value (which is for use in determining whether to cause handover from the second RAN cell to the first RAN cell) based on the first handover parameter value. The calculated adjustment may further be based on the IRAT MLB function. In one instance, the information may include the first handover parameter value. The second controller may receive the first parameter value and calculate an adjustment to the second handover parameter value based on the first handover parameter value. The calculated adjustment may further be based on the IRAT MLB function.

In an embodiment, the coordination discussed above may be accomplished through a RAN information management (RIM) message, which includes a field for the recommended handover threshold value. However, such a message does not take into account that a RAN controller may use multiple handover thresholds for different values of different QoS parameters or UE capability parameters. Thus, if a target cell's controller receives the handover threshold value, it can be ambiguous as to which QoS parameter values or UE capability parameter values the handover threshold value applies. Accordingly, the message content for the IRAT coordination needs to be updated so that information can be transmitted about which QoS parameter values or UE capability parameter values the handover threshold (or other handover condition) applies.

Figure 7:
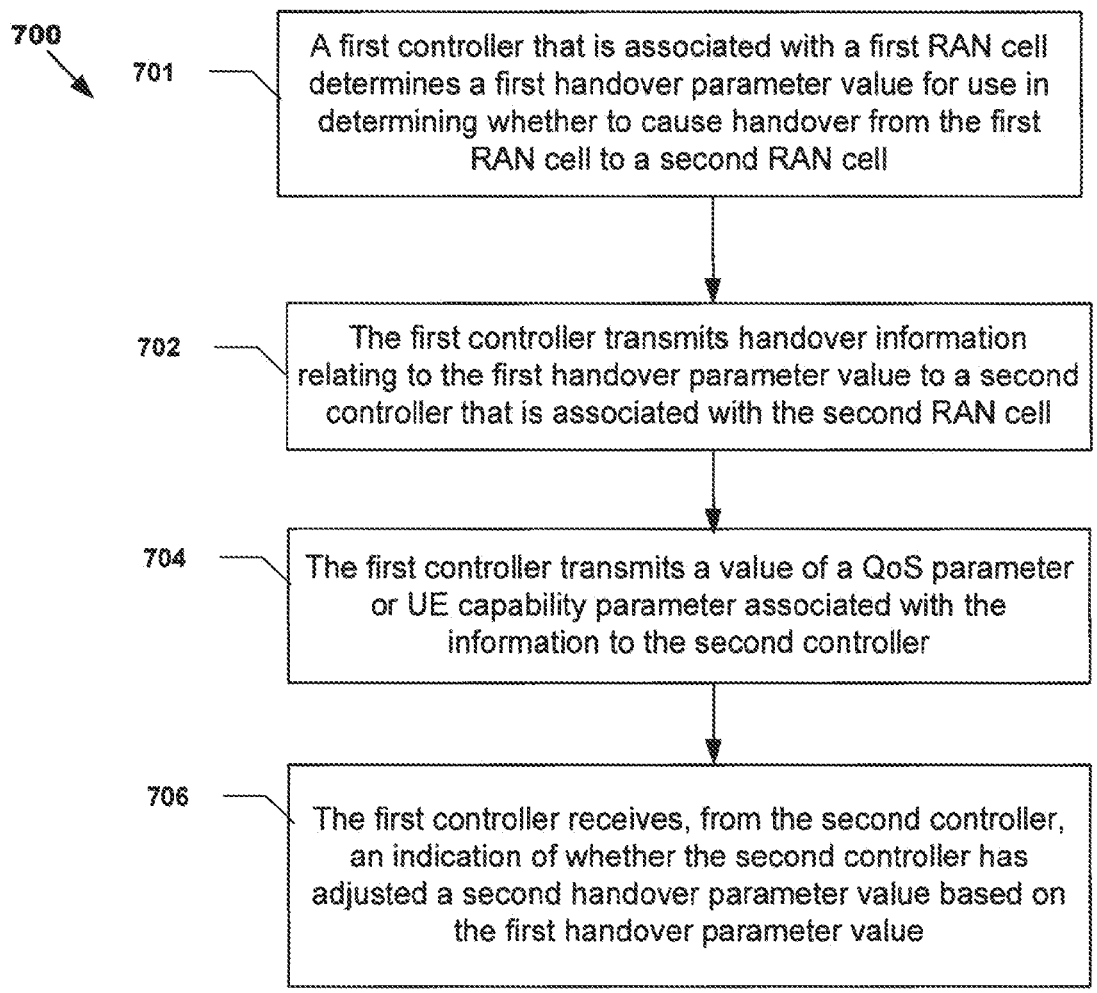
FIGS. 7-11 illustrate flow diagrams according to embodiments of the present disclosure.

FIG. 7 is a flow diagram illustrating a process 700 performed by a first controller that is associated with a first RAN cell (e.g., an e-UTRAN cell) to coordinate handover parameters, such as handover thresholds, with a second controller that is associated with a second RAN cell (e.g., a UTRAN cell). In an embodiment, the first controller (e.g., eNB) controls the first RAN cell and the second controller (e.g., RNC) controls the second RAN cell. The process 700 allows the first controller to convey not only information relating to handover threshold values to the second controller, but also conveys to the second controller the situations in which the information is applicable. In an embodiment, the process 700 begins at step 701, in which the first controller determines a first handover parameter value for use in determining whether to cause handover from the first RAN cell to the second RAN cell. In an embodiment, the first handover parameter value defines a condition that, if satisfied, causes a UE to report a signal measurement to the first controller, which uses the report to determine whether to cause the handover. In an embodiment, the first handover parameter value defines a condition that triggers handover from the first RAN cell to a second RAN cell. In one example, if the first RAN cell is an e-UTRAN cell and the second RAN cell is a UTRAN cell, the first handover parameter value may include at least one of: the threshold value B2_1, a hysteresis value, a the time-to-trigger (TTT) value, and any other value used to determine whether the conditions of the B2 handover event are satisfied. The determination of the first handover parameter value may be based on, for example, an IRAT MRO function being executed by an eNB. In an embodiment, the eNB does not start using the first parameter value unless the second controller indicates, in step 706, that it has made a corresponding adjustment.

In step 702, the first controller transmits information relating to the first handover parameter to the second controller. As discussed in more detail below, in a mode where handover coordination is distributed, the transmitted information includes the first handover parameter value. The second controller then adjusts its own handover parameter value (a second handover parameter value) based on the first handover parameter value. In a mode where handover coordination is centralized in the first controller, the first controller calculates the adjustment to the second handover parameter value, which is then included in the transmitted information. As an example, if first RAN cell is an e-UTRAN cell and the second RAN cell is an UTRAN cell, the eNB of the e-UTRAN determines a B2_1 threshold value as the first handover parameter value. If the coordination is distributed, the handover information transmitted in step 702 comprises or consists of the determined B2_1 value. If the coordination is centralized, the handover information transmitted in step 702 comprises or consists of a 3A_2 value that is calculated based on the determined B2_1 value.

In an embodiment, the transmitted handover information may identify an adjustment amount (e.g., increase or decrease handover threshold by x dB) or an absolute value (e.g., the increased or decreased threshold value, after adjustment, is y dB).

In step 704, the first controller transmits, to the second controller, one or more values of one or more differentiation criteria associated with the information, such as a value of a QoS parameter or a value of a UE capability parameter.

QoS parameters may include parameters that affect a level of service provided to or expected by a user equipment (UE) being served by the first RAN cell or the second RAN cell. In an embodiment, a QoS parameter includes one or more of a QCI of a signal bearer (e.g., EPS bearer) being used by the UE, an ARP of the signal bearer, an indication of whether the signal bearer is a GBR bearer, and an indication of whether the signal bearer is carrying real-time data. UE capability parameters may indicate UE capability. It may include, for instance, one or more of a UE category, a UE RRM configuration (e.g., a DRX configuration), a UE subscription type, and a velocity of the UE (e.g., high speed or low speed).

For example, an eNB may communicate to a NB a threshold value 3A_2, a QoS parameter and UE capability parameter, such as QCI and UE category, and a set of values (also referred to as instances) for the parameters. The set of values for QCI may, for instance, include 2 and 4, while the set of values for UE category may include category 1 and category 2. This creates 4 (2×2) combinations (i.e., modes) of QoS parameter values to which the adjusted threshold 3A_2 applies:

Mode 1: QCI=2 and UE category=1
Mode 2: QCI=2 and UE category=2
Mode 3: QCI=4 and UE category=1
Mode 3: QCI=4 and UE category=2

In the embodiment, if a UE in the second RAN cell had a UE category value of category 3, the second controller may refrain from relaying the adjusted 3A_2 value to the UE. Another UE in the second RAN cell may have a UE category of category 2, and may receive the adjusted 3A_2 value. However, it may use that adjusted threshold value only if it is currently using a bearer having a QCI value of 2 or 4.

In an embodiment, two threshold parameter values may be associated with different sets of differentiation criteria or values of the differentiation criteria. For instance, the threshold value of 3A_2 may be associated with QCI and UE category values, while the threshold value of B2_1 may be associated with UE category and UE subscription type values.

In step 706, the first controller receives, from the second controller, an indication of whether the second controller has adjusted a second handover parameter value based on the first handover parameter value, where the second handover parameter value is for use in determining whether to cause handover from the second RAN cell to the first RAN cell. In an embodiment, the second handover parameter value defines a condition that, if satisfied, causes the UE to report a signal measurement to the second controller, which uses the report to determine whether to cause the handover. In an embodiment, the second handover parameter value defines a condition that triggers handover from the second RAN cell to the first RAN cell. As an example, if an eNB transmitted a recommended 3A_2 value that is based on a B2_1 value to a RNC, the indication may indicate that the RNC accepts or rejects the adjusted 3A_2 value. If the eNB transmits the B2_1 value to the RNC, the indication may indicate i) that the RNC has adjusted its 3A_2 value based on the transmitted B2_1 value or ii) that the RNC has not adjusted its 3A_2 value.

Figure 8:
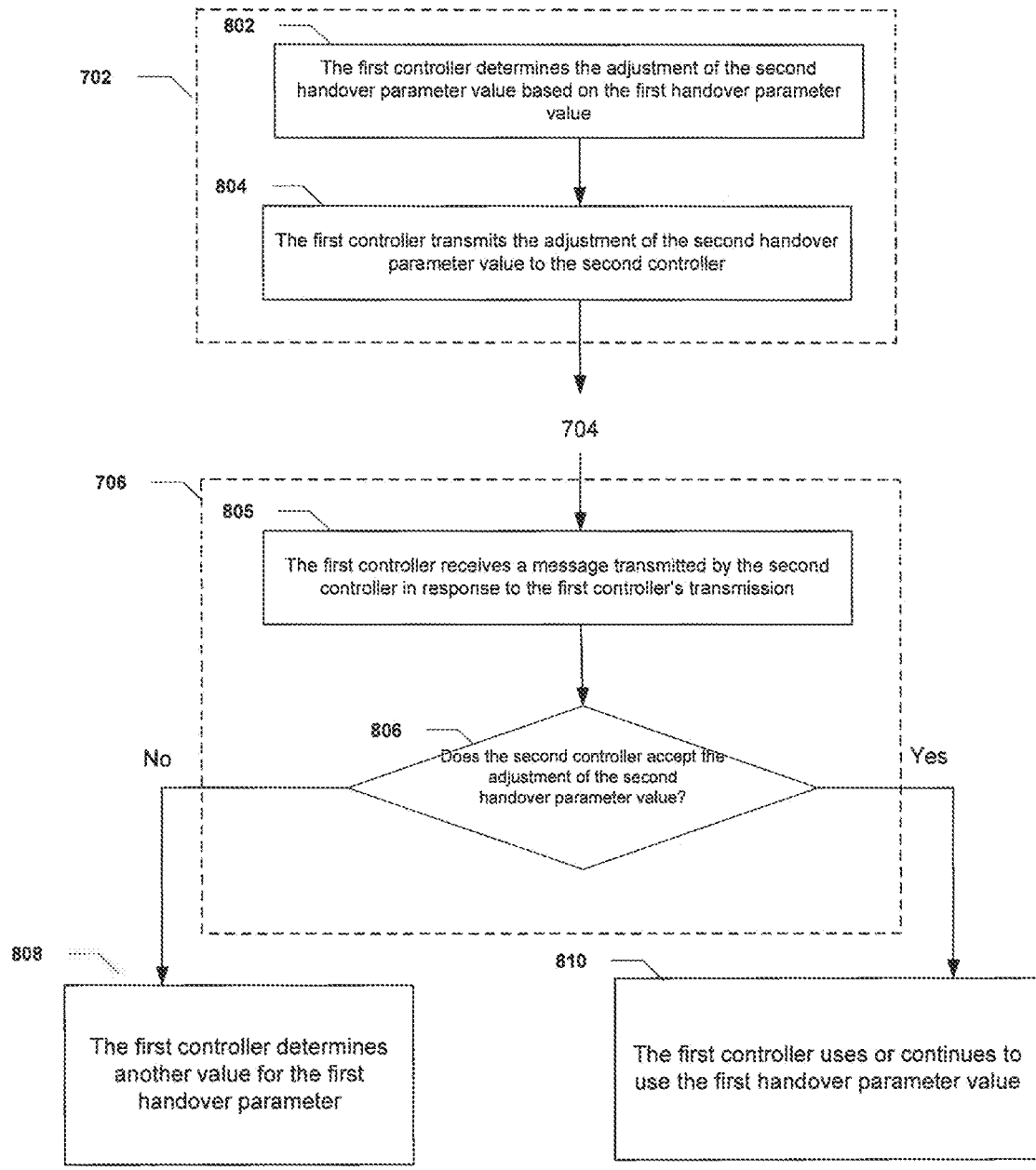

FIG. 8 illustrates an example of centralized handover coordination. More specifically, the coordination of handover between two RAN cells may be centralized in the first controller. Step 802 is part of a scenario in which the coordination is centralized in the first controller. In step 802, the first controller determines the adjustment to the second handover parameter value (e.g., 3A_2) based on the first handover parameter value (e.g., 3A_2).

In step 804, the first controller transmits the adjustment of the second handover parameter value to the second controller. For instance, after an eNB calculates a corresponding adjustment to 3A_2, it transmits the corresponding adjustment as a recommendation to the RNC of the UTRAN cell, either as an adjustment amount (e.g., increase by 20 dBm) or as the adjusted value (e.g., the adjusted 3A_2 value is y dBm).

In step 805, the first controller receives a message transmitted by the second controller in response to the recommended adjustment transmitted in step 804 and the parameter value transmitted in step 704, wherein the message comprises information indicating whether the second controller has accepted the adjustment. In step 806, the first controller determines whether the second controller accepts the adjustment of the second handover parameter value based on information included in the message. For instance, if the controller of the e-UTRAN transmits the corresponding adjustment to the 3A_2 threshold value to the UTRAN cell's controller, the UTRAN cell's controller can choose to adopt the adjustment, or may choose to reject the adjusted 3A_2 threshold value. In an embodiment, the UTRAN cell's controller may provide in the message it sends to the first controller information identifying a reason for the rejection. The reason may include, for instance, that the UTRAN cell does not support the particular QoS parameters or UE capability parameters associated with the 3A_2 value, the particular values of the QoS parameters or UE capability parameters, that the 3A_2 value falls outside a supported range, or any other reason. If the adjusted 3A_2 value falls outside a range of threshold values supported by the UTRAN cell's controller, that UTRAN cell's controller may include in the message information identifying the supported range of threshold values.

In step 808, in response to determining that the second controller does not accept the corresponding adjustment, the first controller may determine another value for the first handover parameter (e.g., another B2_1 value). For instance, an eNB may initially determine an increase to a B2_1 threshold value and determined a corresponding increase to the 3A_2 value, but the RNC may reject the corresponding increase to the 3A_2 value. In response, the eNB may choose not to increase the original B2_1 threshold value, or to increase it by a smaller amount. In an embodiment, if the second controller responded with a range of supported threshold values (e.g., 3A_2 values), the first controller may perform the recalculation based on the range.

In step 810, in response to determining that the second controller accepts the corresponding adjustment, the first controller may start using or continue to use the first handover parameter value (e.g., B2_1 value) for identifying a handover event from the first RAN cell to the second RAN cell.

In an embodiment, the transmission in steps 702 and 704 are part of a RAN Information Management (RIM) message. Table 2 illustrates an example format, referred to herein as Format 1, of a RIM Request Transfer message used in a scenario in which handover coordination is centralized in an eNB of an e-UTRAN cell. The format allows the e-UTRAN to transmit a recommended corresponding adjustment of 3A_2 threshold value to the UTRAN cell:

TABLE 2

Format 1 of RIM Request Transfer message

| Parameter (e.g., field) of the report | Description |
| --- | --- |
| Global Cell ID of Source cell | Cell Identity |
| Global Cell ID of target cell | Possible values: Cell Identity or Identification of a group of neighbour cells or Indication that all target cells of a certain RAT are selected |
| Handover Trigger Change | Indicates a change of handover trigger with respect to serving cell signal threshold. The actual value is IE value * 0.5 dB. |
| Absolute Handover Threshold | Indicates the absolute value of the handover triggering threshold (in dB) at serving cell. |
| Dimensions (e.g., differentiation criteria) (optional) | Possible values: Per bearer QCI Per bearer resources, e.g. GBR or Non GBR Per bearer services, e.g. Real Time, non-Real Time UE capabilities Per UE RRM configuration, e.g. DRX configuration This field specifies the specific differentiation criteria (e.g., QoS parameters or UE capability parameter), such as QCI, UE category, UE type, subscription type, for which the handover threshold value applies |

TABLE 2-continued

Format 1 of RIM Request Transfer message

| Parameter (e.g., field) of the report | Description |
|---|---|
| Instance groups (optional) | This field specified the criteria and instances (e.g., values) for which the handover trigger point was changed. For example, assuming the instances are QCI (2, 4) and UE Category (A, B), the instance grouping will be [2, A] [2, B] [4, A] [4, B]. It might be the case that IRAT MRO or operator decides to disable some of the instances. Also this field can inform the peer RAT of what corrective action needs to be taken. |
| Report identity | Identity for this report |
| Recommended Values for the Target RAT | Recommended absolute and/or incremental value(s) for mobility parameters in the target RAT (e.g. 3A_2) or directions per instance group associated to the instance groupings. |

As the table above illustrates, the first controller may further transmit, in an embodiment, at least one of a cell ID of the first RAN cell and a cell ID of a second RAN cell. In an embodiment, the cell ID may identify a group of cells to which the recommended 3A_2 value is addressed.

In an embodiment, the indication received in step 706 may be received as part of a RIM response message. In a scenario in which the handover coordination is centralized in an eNB, the response message may indicate whether a recommended corresponding adjustment to 3A_2 has been accepted or rejected. Tables 3 and 4 below illustrate the RIM response message:

TABLE 3

Acknowledgment indicating acceptance of handover threshold values

| Parameter of the report | Description |
|---|---|
| Global Cell Identity of source cell | Cell Identity |
| Global Cell Identity of target cell | Possible values: Cell Identity or Group of neighbour cells indication or All target RAT cells indication |
| Report ID | Identity for this report |

TABLE 4

Acknowledgment indicating rejection of handover threshold values

| Parameter of the report | Description |
|---|---|
| Global Cell Identity of source cell | Cell Identity |
| Global Cell Identity of target cell | Possible values: Cell Identity or Group of neighbour cells indication or All target RAT cells indication |
| Report identity | Identity for this report |
| Cause | Indicates the cause of failure to implement suggested changes. For example: changes outside configured range; handover threshold not changeable. A list of differentiation criteria and values of the differentiation criteria that are disabled by UTRAN may also be provided. |

TABLE 4-continued

Acknowledgment indicating rejection of handover threshold values

| Parameter of the report | Description |
|---|---|
| Mobility Parameters Modification Range | Indicates the range within which the handover threshold can be modified for all or some of the differentiation criteria. |

Figure 9:
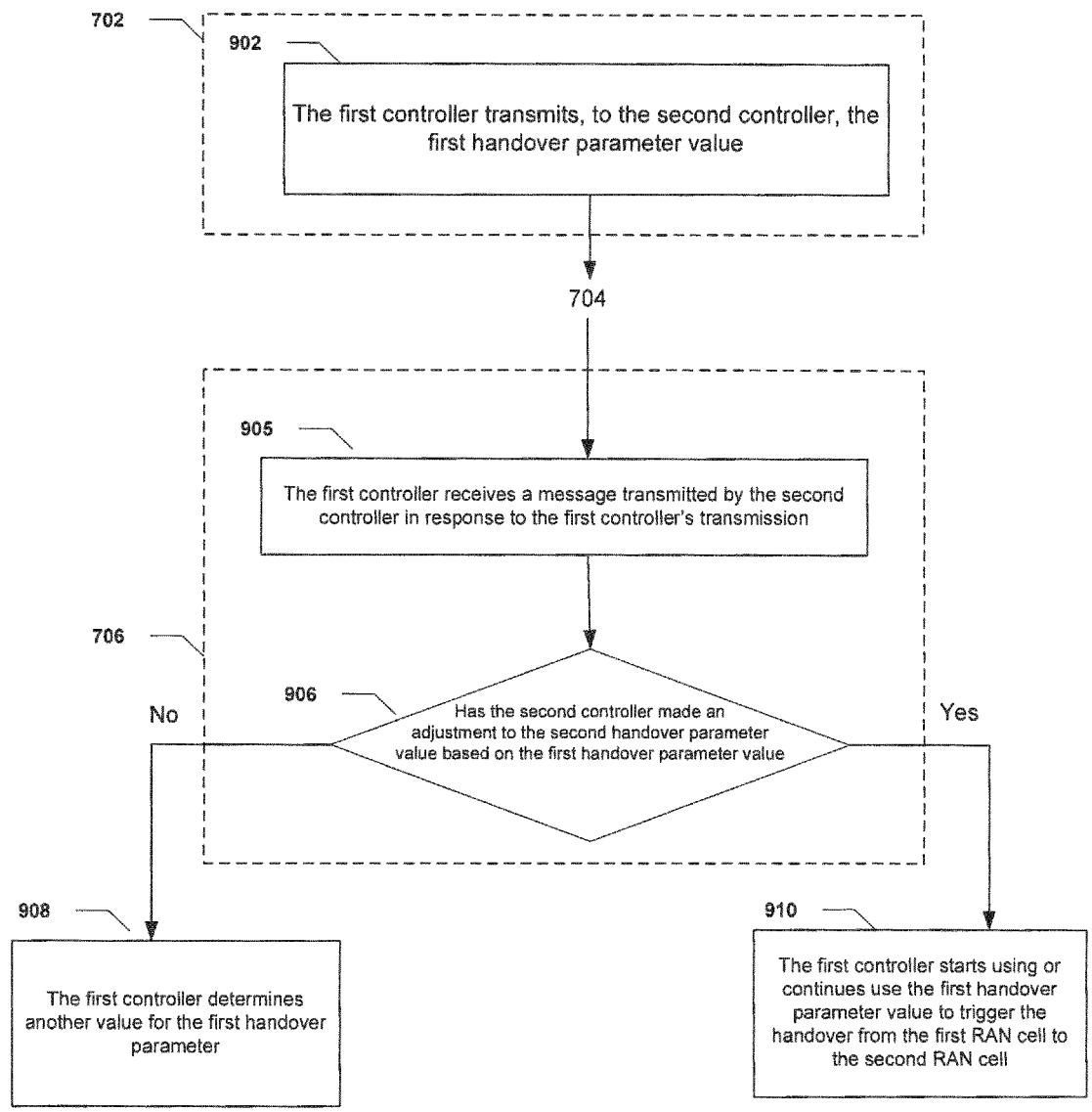

FIG. 9 illustrates an example in which the coordination is distributed among the first and second controllers. In step 902, the first controller transmits, to the second controller, the first handover parameter value (e.g., B2_1). In other words, the transmitted handover information in this embodiment comprises or consists of the adjustment determined in step 701. In the distributed coordination scenario, the first controller (e.g., eNB) is not responsible for calculating a corresponding adjustment to a threshold value used for the handover in the other direction (e.g., the 3A_2 value for UTRAN-to-eUTRAN handover). Instead, for instance, the eNB communicates the adjustment of the B2_1 threshold value to the UTRAN's RNC, and relies on the UTRAN to determine a corresponding adjustment to its 3A_2 value.

In step 905, the first controller receives a message transmitted by the second controller in response to the adjustment transmitted in step 904 and the parameter value transmitted in step 704, wherein the message comprises information indicating whether the second controller has made an adjustment to the second handover parameter value based on the first handover parameter value.

In step 906, the first controller may determine whether the second controller has made the corresponding adjustment based on information included in the message. For example, if an eNB had determined an increase to B2_1 and transmitted the increase to a RNC, the eNB may receive, in response, a message indicating whether the RNC has made a corresponding increase to its 3A_2 value.

In step 908, like in step 808, in response to determining that the second controller has not made a corresponding adjustment to the second handover parameter value (e.g., 3A_2), the first controller may determine another value for the first handover parameter (e.g., another B2_1 value).

In step 910, like in step 810, in response to determining that the second controller has made a corresponding adjustment to the second handover parameter value (e.g., 3A_2), the first controller may start using or continue to use the second handover parameter value (e.g., B2_1) for triggering handover from the first RAN cell to the second RAN cell.

In an embodiment, the transmissions in step 902 and 704 are part of a RAN Information Management (RIM) message. Tables 5A-5B illustrate example formats, referred to herein as Format 5A and 5B, respectively, of a RIM Request Transfer message used in a scenario in which handover coordination is distributed in an eNB of an e-UTRAN cell and a RNC of a UTRAN cell. Format 5A allows the e-UTRAN cell to communicate its B2_1 value to a UTRAN cell, while Format 5B allows the UTRAN cell to communicate its 3A_2 value to the e-UTRAN cell:

TABLE 5A

Format 2 of RIM Transfer Request Message from eNB to RNC

| Parameter of the report | Description |
|---|---|
| Global Cell Identity of source cell | Cell Identity |
| Global Cell Identity of target cell | Possible values: Cell Identity or Group of neighbour cells indication or All target RAT cells indication |
| Handover Trigger Change | Indicates a change of handover trigger with respect to serving cell signal threshold. The actual value is IE value * 0.5 dB. |
| Absolute Handover Threshold | Indicates the absolute value of the handover triggering threshold at serving cell in dB. |
| Dimensions (optional) | Possible values: Per bearer QCI Per bearer resources, e.g. GBR or Non GBR Per bearer services, e.g. Real Time, non-Real Time UE capabilities Per UE RRM configuration, e.g. DRX configuration This field specifies the criteria of UEs/bearers for which the threshold was changed, e.g. QCIs, UE Category, UE type, subscription type, etc. |
| Instance groups (optional) | This field specified the instances for which the handover trigger point was changed. For example, assuming the instances are QCI (2, 4) and UE Category (A, B), the instance grouping will be [2, A] [2, B] [4, A] [4, B]. It might be the case that IRAT MRO or operator decides to disable some of the instances. Also this field informs the peer RAT of what corrective action needs to be taken. |
| Report identity | Identity for this report |
| New values changed in the Source RAT | New absolute and/or incremental value(s) of mobility parameters e.g. B2_1 or directions per instance groupings. |

TABLE 5B

Format 2 of RIM Transfer Request Message from RNC to eNB

| Parameter of the report | Description |
|---|---|
| Global Cell Identity of source cell | Cell Identity |
| Global Cell Identity of target cell | Possible values: Cell Identity or Group of neighbour cells indication or All target RAT cells indication |
| Handover Trigger Change | Indicates a change of handover trigger with respect to serving cell signal threshold. The actual value is IE value * 0.5 dB. |
| Absolute Handover Threshold | Indicates the absolute value of the handover triggering threshold at serving cell in dB. |
| Dimensions (optional) | Possible values: Per bearer service type Per bearer resources, e.g. GBR or Non GBR Per bearer services, e.g. Real Time, non-Real Time UE capabilities Per UE RRM configuration, e.g. DRX configuration This field specifies the specific conditions of UEs/bearers for which the threshold was changed, e.g. QCIs, UE Category, UE type, subscription type. |
| Instance groups (optional) | This field specified the value of the dimension for which the handover trigger point was changed. For example, assuming the dimensions/instances are QCI (2, 4) and UE Category (A, B), the instance grouping will be [2, A] [2, B] [4, A] [4, B]. It might be the case that IRAT MRO or operator decides to disable some of the dimension's values. Also this field informs the peer RAT of what corrective action needs to be taken. |
| Report identity | Identity for this report |
| Object relation identities | It depends on the object relation. If the Object relation is LTE cell-UTRAN cell, these identities can be the ECGI in or the UTRAN cell identity. |
| New values changed in the Source RAT | New absolute and/or incremental value(s) of mobility parameters e.g. 3A_2 or directions per instance groupings. |

Figure 10:
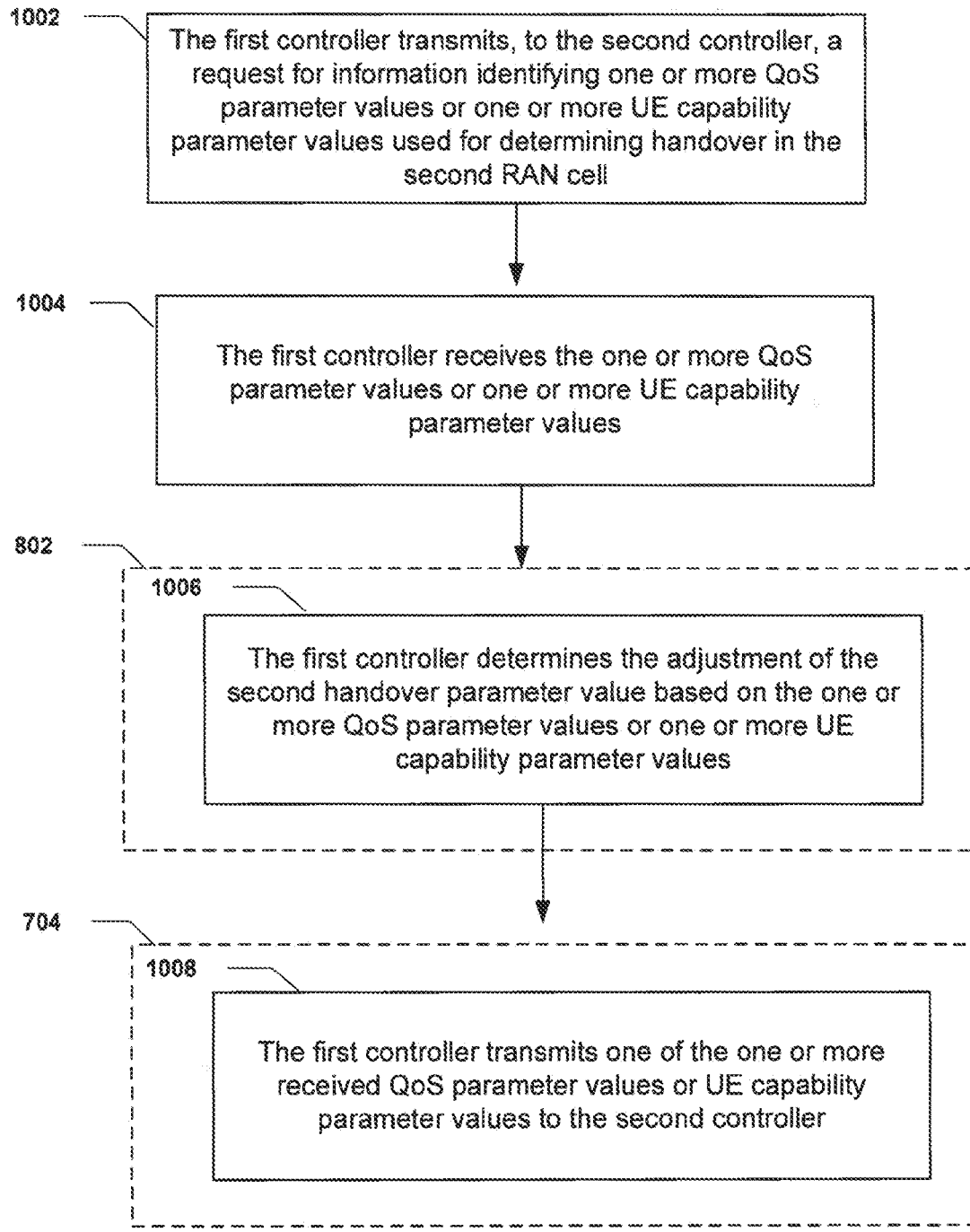

FIG. 10A illustrates an embodiment in which one controller may query another controller to determine which differentiation criteria (e.g., QoS parameters and/or UE capability parameters), or more specifically which instances of the differentiation criteria (e.g., which QoS parameter values and/or UE capability parameter values), are supported by the other controller for determining handover. More specifically, in step 1002, the first controller transmits to the second controller a request for the one or more QoS parameter values or one or more UE capability parameter values used for determining handover in the second RAN cell. As an example, an eNB of an e-UTRAN cell may request, from a RNC of a UTRAN cell, information that identifies which differentiation criteria (e.g., QCI, UE category) are supported by the RNC, and that further identifies which values of those parameters (e.g., QCI values of 2 and 4, UE category values of category 1 and category 2) are supported.

This information is received in step 1004, and allows the first controller to tailor the handover coordination so that it transmits only handover parameter adjustments that correspond to a supported set of differentiation criteria values (e.g., QoS parameter values and/or UE capability parameter values). For instance, in step 1006, the first controller may determine the adjustment of the second handover parameter value based on the received QoS parameter values or UE capability parameter values. As an example, if a controller receives from a UTRAN cell an indication that QCI values of 2 and 4 are used in determining handover, the controller may determine the adjustment of the 3A_2 value for a situation in which QCI=2.

In step 1008, the first controller may transmit one of the one or more received QoS parameter values or UE capability parameter values. Because the one or more parameter values were received from the second controller, the first controller may thus know that they will be supported by the second RAN cell.

Figure 11:
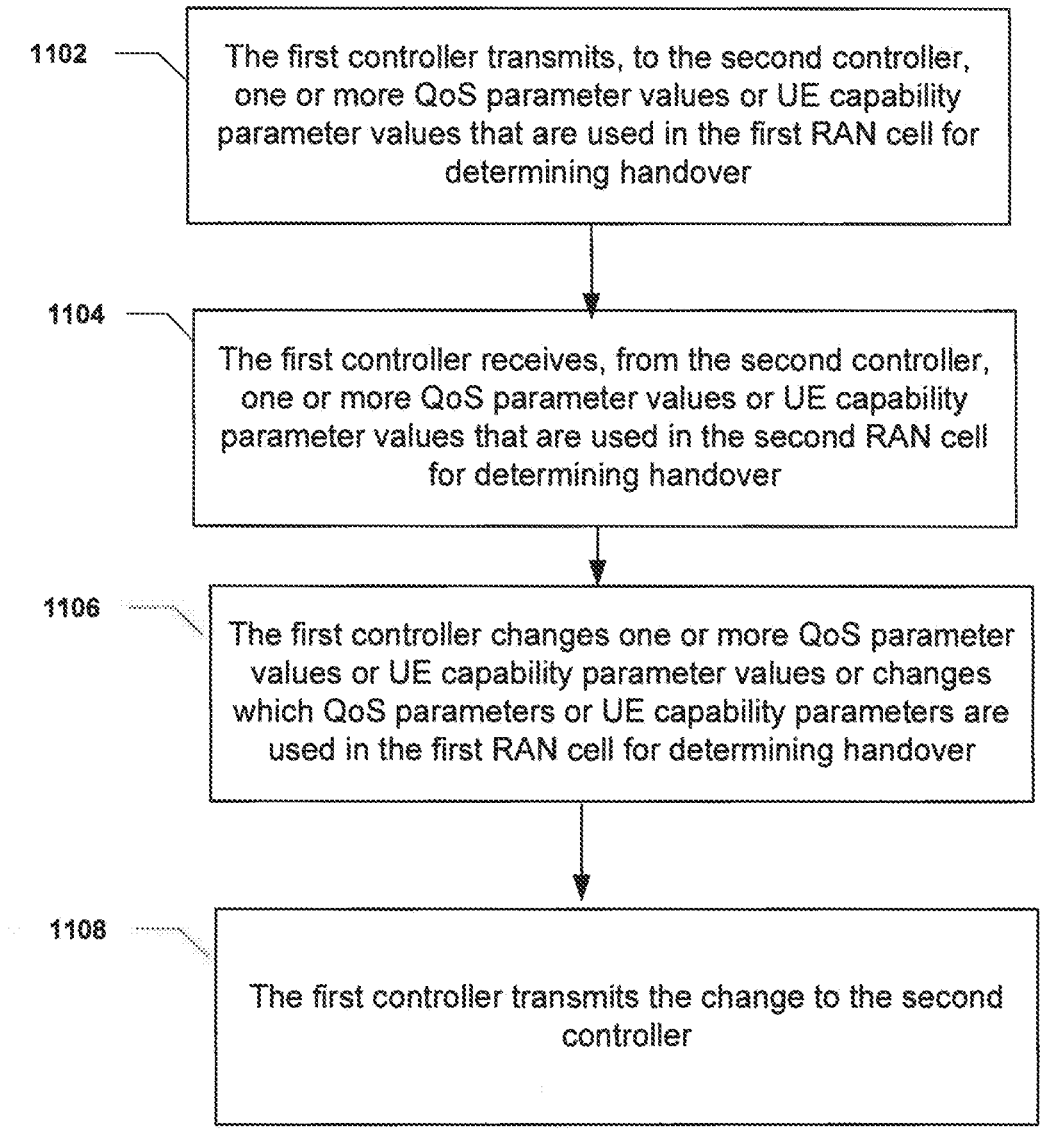

FIG. 11 illustrates a process in which controller may notify each other of their differentiation criteria as part of a distributed coordination scenario. In step 1102, the first controller transmits to the second controller one or more QoS parameter values or UE capability parameter values that are used in the first RAN for determining handover. As an example, an eNB may be associated with the following values of QoS parameters and UE capability parameters: (QCI=2, UE category=category 1); (QCI=4, UE category=category 1); (QCI=2, UE category=category 2); (QCI=4, UE category=category 2). In the example, it may transmit information that identifies the combination to a RNC of a UTRAN cell.

In step 1104, the first controller receives from the second controller one or more QoS parameter values or UE capability values that are used in the second RAN cell for determining handover. Steps 1102 and 1104 allow two RAN cells to be aware of the differentiation criteria and/or differentiation criteria values used by the other RAN. Such awareness may optimize the calculation of adjustments of the handover parameter values.

In an instance of step 1106, the first controller may change one or more QoS parameter values or UE capability parameter values used in the first RAN cell for determining handover.

For example, if the eNB originally uses (QCI=2, UE category=category 1); (QCI=4, UE category=category 1); (QCI=2, UE category=category 2); (QCI=4, UE category=category 2) for determining handover, it may remove support for the QCI parameter, and remove support for UE category value of category 1, such that only the combination (UE category=category 2) is used for determining handover.

In step 1008, the first controller may transmit the change to the second controller.

Figure 12A:
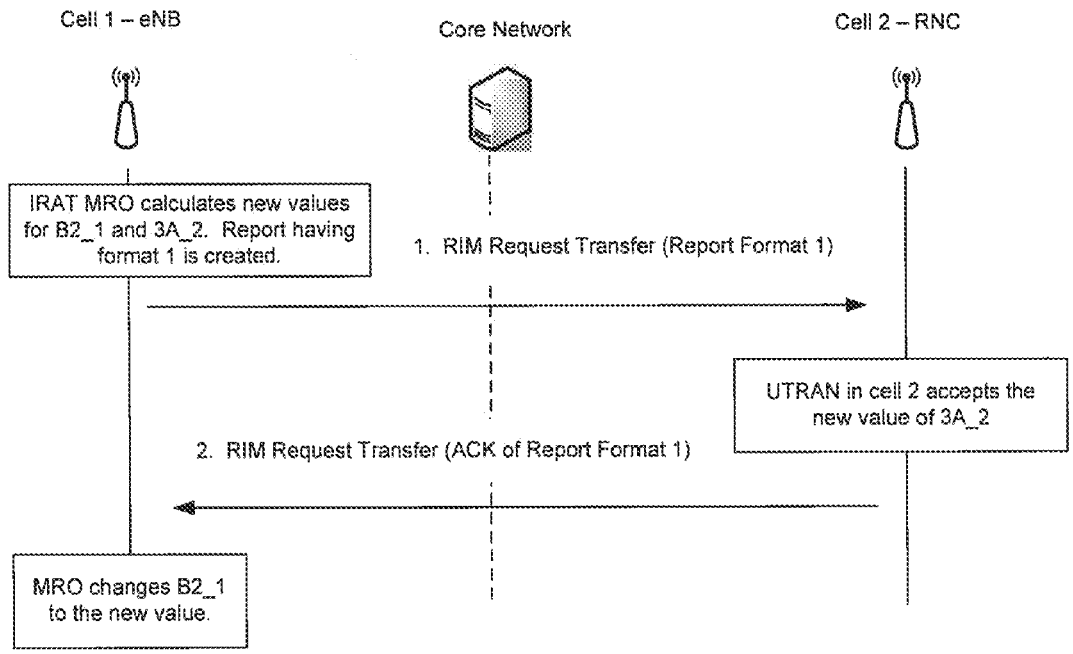
FIGS. 12A-15 illustrate signal diagrams according to embodiments of the present disclosure.
Figure 12B:
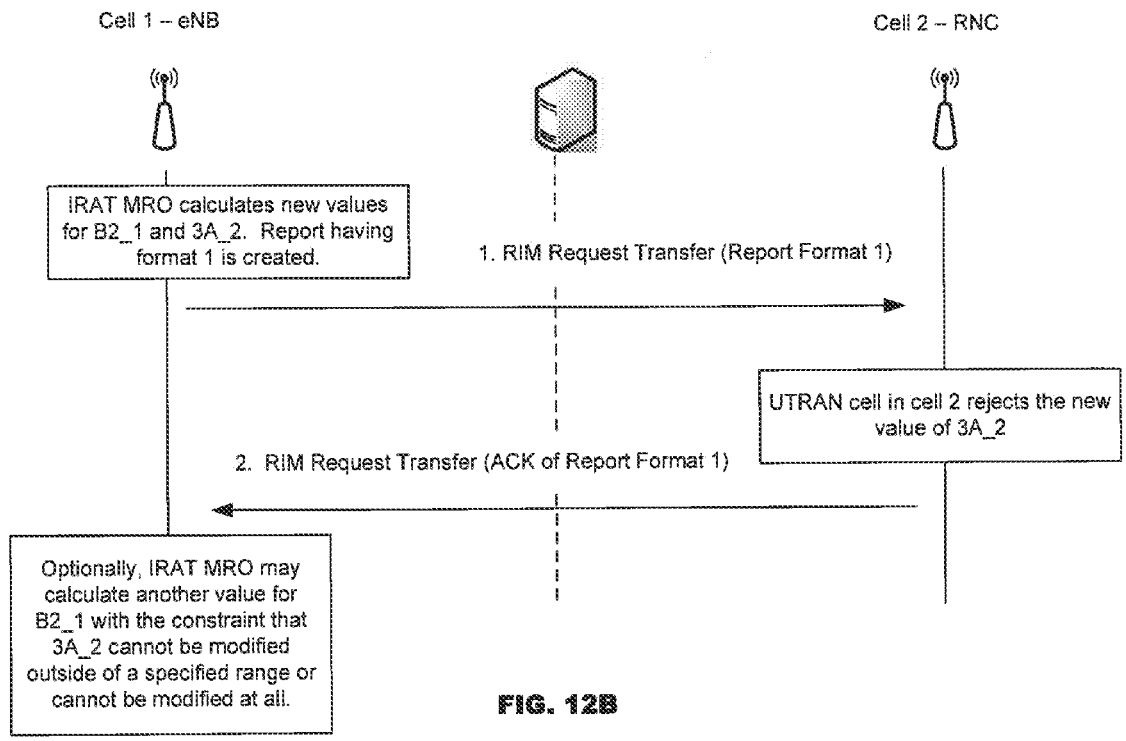
Figure 13A:
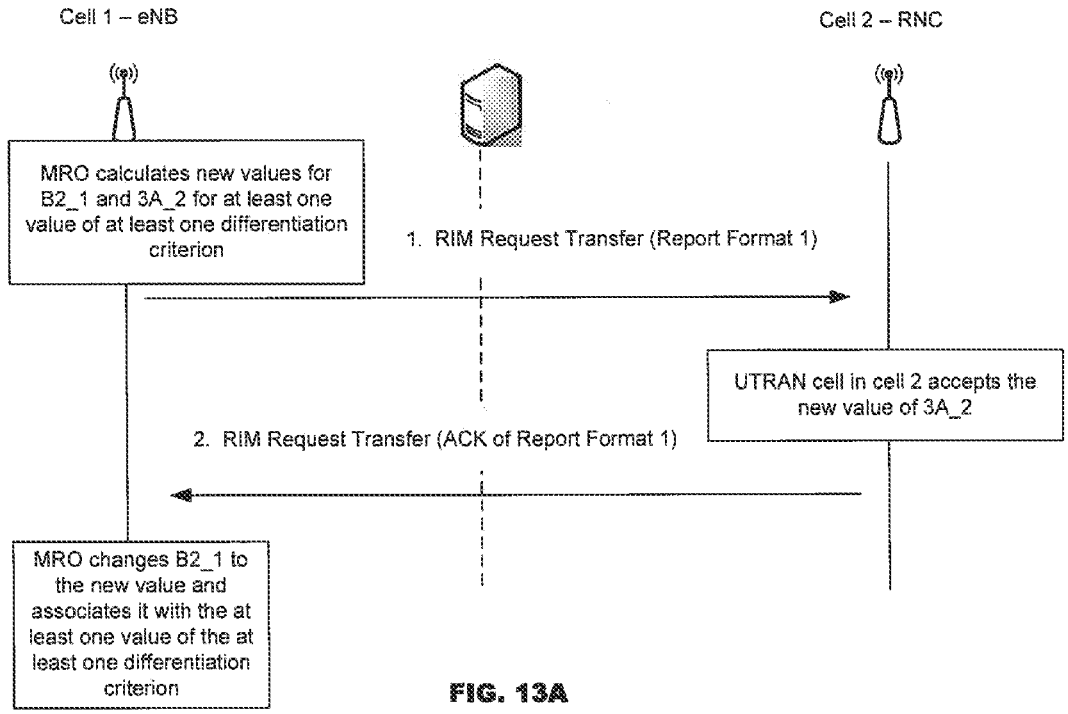
Figure 13B:
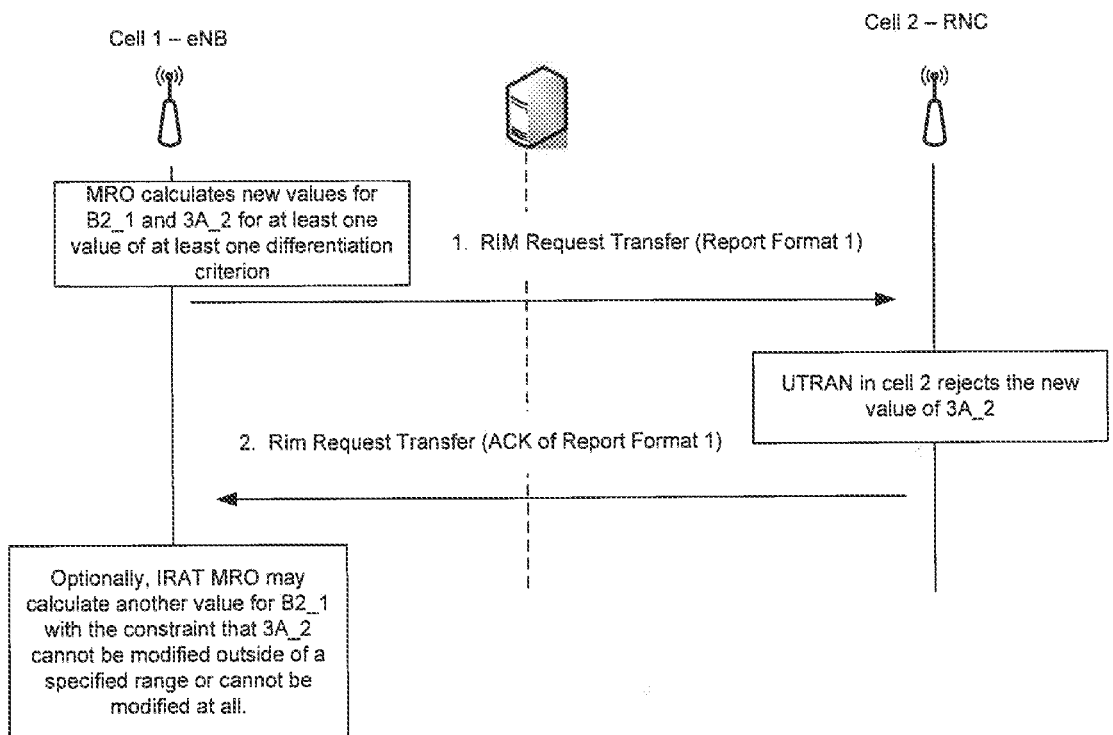
Figure 14:
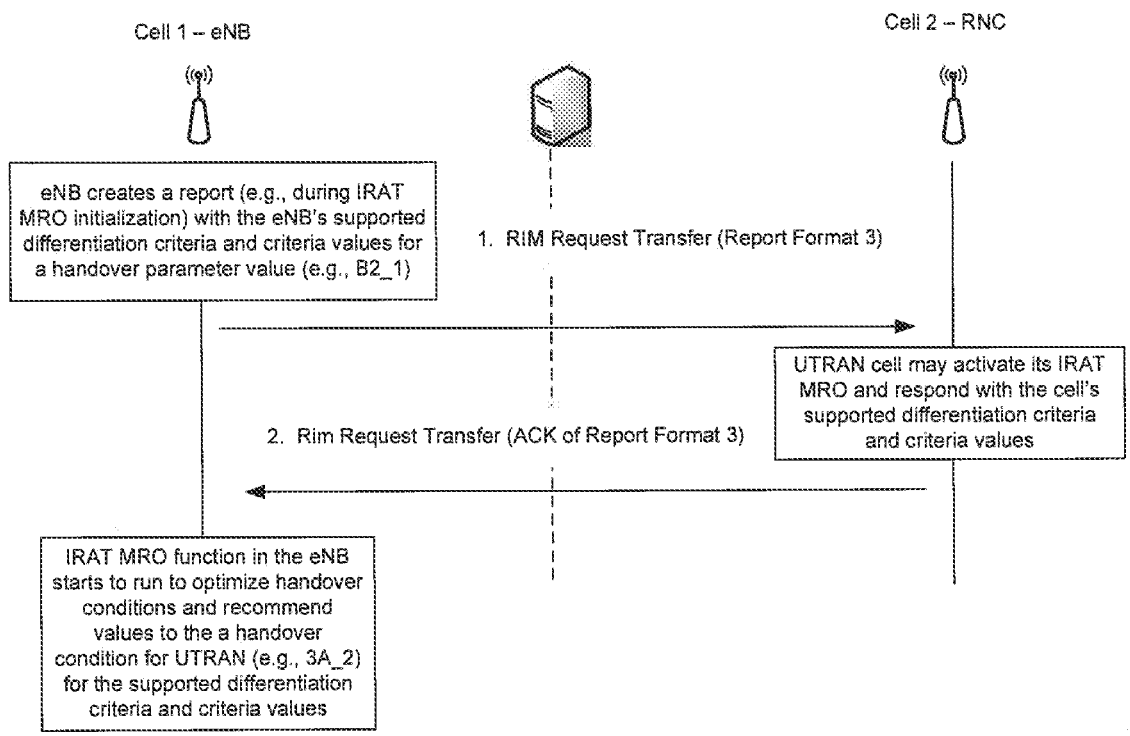

FIGS. 12A-12B, 13A-13B, and 14 illustrate the handover coordination described above in the context of a controller (e.g., eNB) for an e-UTRAN cell and a controller (e.g., RNC) for a UTRAN cell. FIGS. 12A-12B illustrate an embodiment in which the coordination does not involve the communication of differentiation criteria values (e.g., QoS parameter values and UE capability parameter values). FIGS. 13A-13B and 14 illustrate embodiments in which the coordination does involve the communication of differentiation criteria values, which allows the handover information to be tailored to particular situations. Thus, for example, a handover threshold may be adjusted to different values for different QoS requirements. A UE performing signal measurements may then choose from multiple handover threshold values based on the QoS parameter values of its active bearers.

In FIG. 12A, the eNB may calculate new handover threshold values, such as new values for B2_1 and 3A_2. In an embodiment, the calculation may performed from an IRAT MRO function, and may be derived from one or more RLF failure statistics. The new handover threshold value 3A_2 may be transmitted from the e-UTRAN cell to the UTRAN cell. The transmitted handover threshold value may be transmitted in a RAN information management (RIM) Request Transfer message. Because the illustration of FIG. 12A corresponds to a coordination that is centralized in the eNB, the RIM message has Report Format 1, which is shown above.

Upon receiving the new 3A_2 value, the UTRAN cell may accept the new 3A_2 value (as shown in FIG. 12A) or may reject the new 3A_2 value (as shown in FIG. 12B). If the eNB is notified that the UTRAN cell accepts the new 3A_2 value, the eNB may then change the B2_1 value for the e-UTRAN cell to the new value (assuming that it has not done so already). If the UTRAN cell instead rejects the new 3A_2 value, the eNB may refrain from changing the B2_1 threshold to the new value, and may instead calculate another B2_1 value. The calculation of another B2_1 value may be based on a constraint that 3A_2 cannot change at all from its previous value, or that cannot change outside of a specified range. In an embodiment, this constraint may be provided in the RIM response message from the UTRAN, as a reason that the new 3A_2 value was rejected. For instance, the UTRAN cell may indicate that the 3A_2 value is beyond a maximum value or a minimum value, or that the 3A_2 value cannot be changed at all. If the new 3A_2 value were communicated as an increment or decrement, the reason for rejection may indicate that increment or decrement exceeds a maximum amount.

In an embodiment, in waiting for the RIM response message from the UTRAN cell, the e-UTRAN may maintain a timer. If the timer expires and no response is received, the e-UTRAN may retransmit the RIM Transfer Request message a certain number of times. If the e-UTRAN still receives no response, it may assume that the e-UTRAN has rejected the handover threshold values in the RIM Transfer Request message.

Like FIGS. 12A-12B, FIGS. 13A-13B provide a signal diagram that shows a centralized handover coordination in which an eNB transmits a new 3A_2 value to a target UTRAN cell, which may respond with an acceptance of the new 3A_2 value or a rejection of the new 3A_2 value. The embodiment in FIGS. 13A-13B further apply the new 3A_2 value and the corresponding new 3A_2 value to one or more specific values (also referred to as specific instances) of one or more specific QoS parameters (or any other differentiation criteria). The eNB may thus transmit the one or more specific values of the one or more specific differentiation criteria with the new 3A_value.

In an embodiment, upon receiving the new 3A_2 value, the UTRAN cell may decide to accept the 3A_2 value for a situation in which the one or more specific differentiation criteria values apply (FIG. 13A), or may decide to reject the 3A_2 value (FIG. 13B). If the UTRAN rejects the new 3A_2 value, it may provide a reason in a RIM response message. Like in FIG. 11B, the reason may include a 3A_2 value that is too high or too low. In FIG. 13B, the reason may further include a lack of support for the one or more specific values of the one or more specific differentiation criteria, or a lack of support for a differentiation criterion itself. For example, a RAN cell may indicate that it does not support the ARP parameter, or does not support specific values of the ARP parameter.

In an embodiment, upon receiving the RIM response message, the eNB may calculate a new B2_1 value based on the constraint that 3A_2 cannot be changed outside of a specified range, cannot be modified at all, and/or can be changed for only specific values of specific differentiation criteria.

FIG. 14 illustrates a particular embodiment of a distributed coordination scheme in which a UTRAN cell and e-UTRAN cell may share their differentiation criteria values. Thus, the eNB of the e-UTRAN cell may create a report that indicates it uses QCI values of 2 and 4 in determining handover, and transmit the report to the UTRAN cell. The report may allow the UTRAN cell to make an adjustment to its 3A_2 value that better corresponds to the QCI values used by the e-UTRAN cell. Similarly, the UTRAN cell may create a report that indicates, for example, that it uses QCI values of 2, 3, 4 and UE category values of category 1 and 2 in determining handover. The report from the UTRAN may be used in a centralized coordination scheme in which the e-UTRAN cell, in the future, recommends a 3A_2 value to the UTRAN cell. Because the e-UTRAN cell knows the differentiation criteria values being used by the UTRAN cell, it may provide a recommendation that better corresponds to the differentiation criteria.

Figure 15:
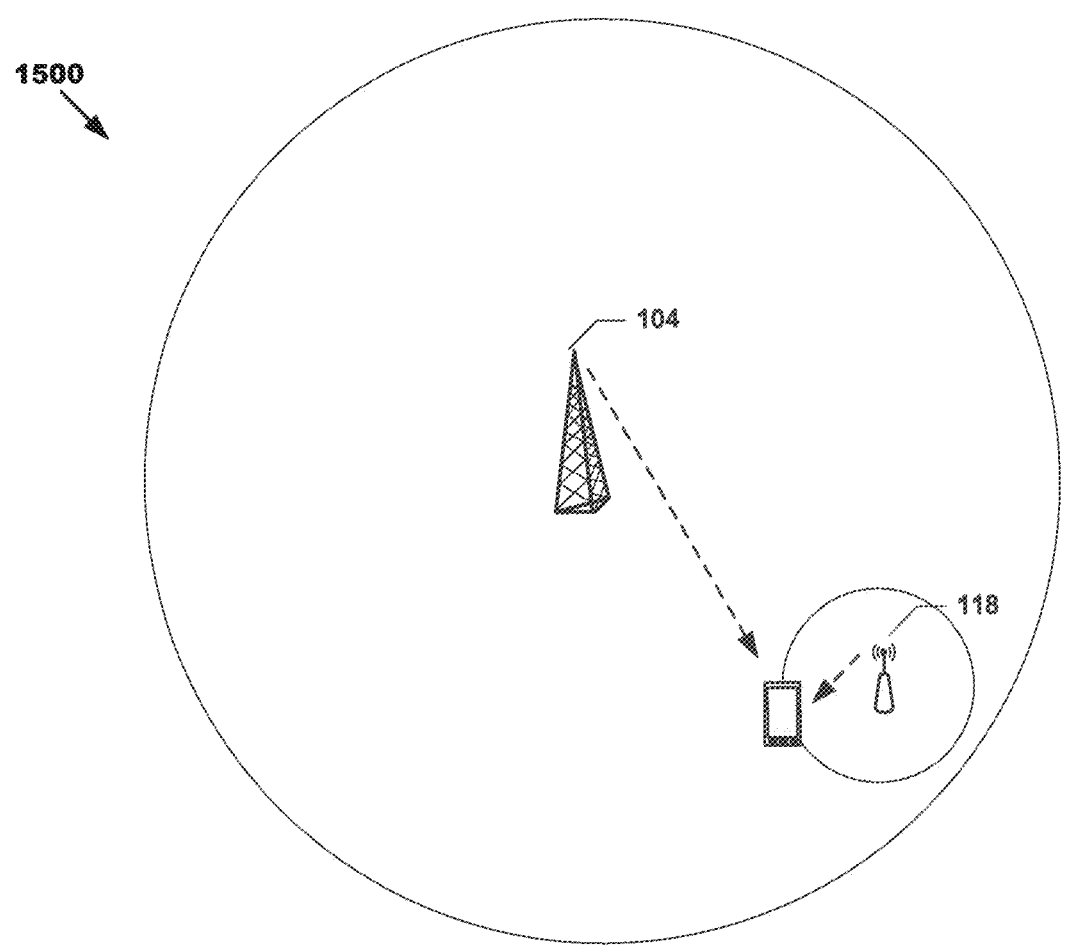

The methods described above are not limited to two radio access networks (RANs). FIG. 15 illustrates an example system 1500 involving a RAN provided by base station 104 and a pico-cell provided by booster device 118. In an embodiment, the RAN provides macro-level coverage while the pico-cell provides only capacity enhancements as a booster link. When both connections are active, the anchor link can be used for control signaling while the booster link is used for data. In some instances, however, the anchor link may also be used to send data via the anchor link. In this case, system information may be sent through the macro-level coverage or through the pico-cell.

Exemplary Controllers of a Radio Area Network

Figure 16:
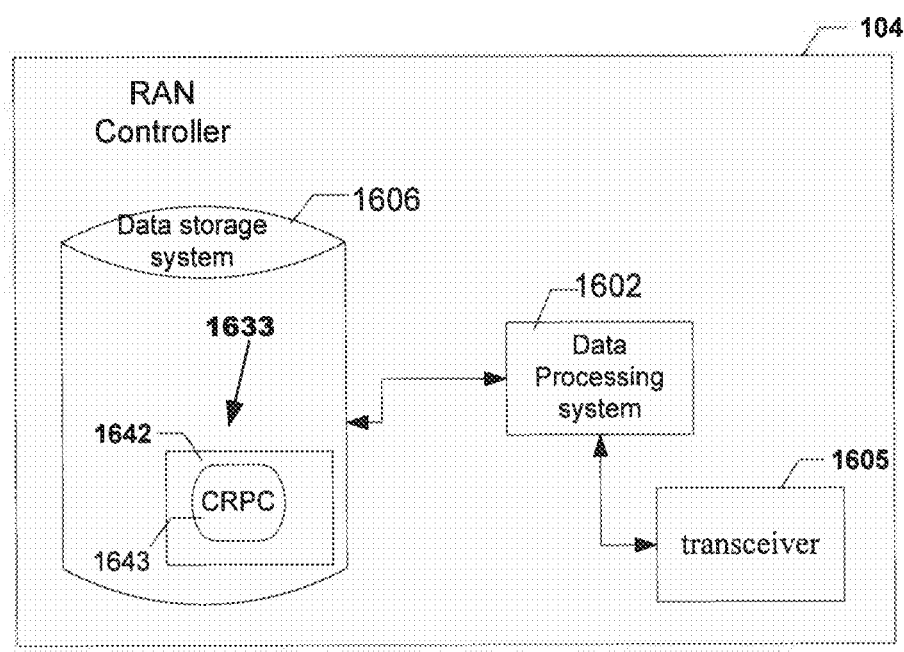
FIG. 16 illustrates a radio access network (RAN) controller according to one embodiment of the present disclosure.

FIG. 16 illustrates a block diagram of controller 104 according to some embodiments. As shown in FIG. 16, controller 104 may include: a data processing system 1602, which may include one or more processors (e.g., microprocessors) and/or one or more circuits, such as an application specific integrated circuit (ASIC), Field-programmable gate arrays (FPGAs), etc.; a transceiver 1605 for receiving message from, and transmitting messages to, another apparatus; a data storage system 1606, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1602 includes a processor (e.g., a microprocessor), a computer program product 1633 may be provided, which computer program product includes: computer readable program code 1643 (e.g., instructions), which implements a computer program, stored on a computer readable medium 1642 of data storage system 1606, such as, but not limited, to magnetic media (e.g., a hard disk), optical media (e.g., a DVD), memory devices (e.g., random access memory), etc. In some embodiments, computer readable program code 1643 is configured such that, when executed by data processing system 1602, code 1643 causes the data processing system 1602 to perform steps described herein. In some embodiments, controller 104 may be configured to perform steps described above without the need for code 1643. For example, data processing system 1602 may consist merely of specialized hardware, such as one or more application-specific integrated circuits (ASICs). Hence, the features of the present invention described above may be implemented in hardware and/or software.

Figure 17:
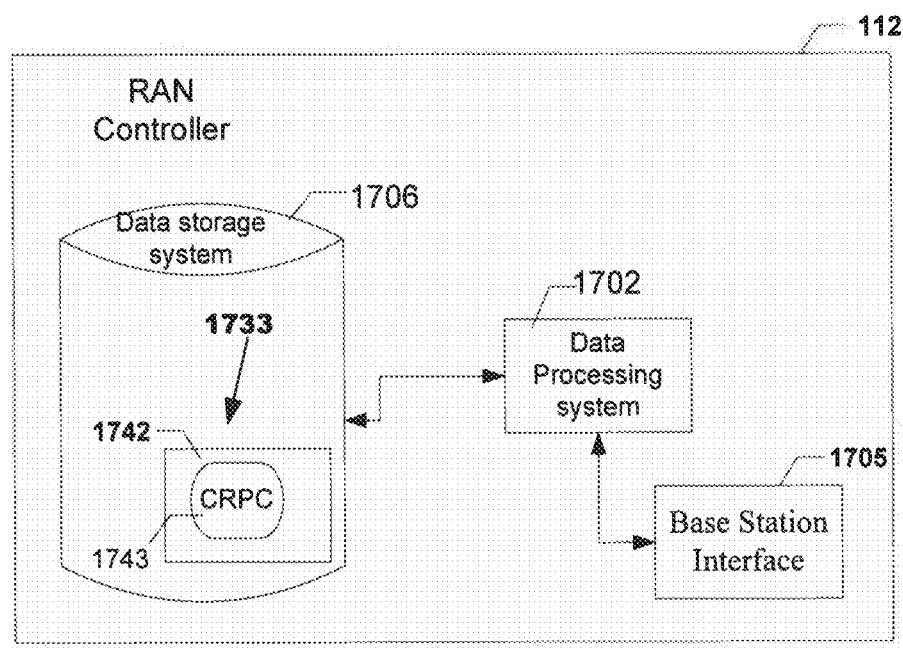
FIG. 17 illustrates a radio access network (RAN) controller according to one embodiment of the present disclosure.

FIG. 17 illustrates a block diagram of controller 112 according to some embodiments. As shown in FIG. 17, controller 112 may include: a data processing system 1702, which may include one or more processors (e.g., microprocessors) and/or one or more circuits, such as an application specific integrated circuit (ASIC), Field-programmable gate arrays (FPGAs), etc.; a base station interface 1705 for receiving message from, and transmitting messages to, another apparatus; a data storage system 1706, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1702 includes a processor (e.g., a microprocessor), a computer program product 1733 may be provided, which computer program product includes: computer readable program code 1743 (e.g., instructions), which implements a computer program, stored on a computer readable medium 1742 of data storage system 1706, such as, but not limited, to magnetic media (e.g., a hard disk), optical media (e.g., a DVD), memory devices (e.g., random access memory), etc. In some embodiments, computer readable program code 1743 is configured such that, when executed by data processing system 1702, code 1743 causes the data processing system 1702 to perform steps described herein. In some embodiments, controller 112 may be configured to perform steps described above without the need for code 1743. For example, data processing system 1702 may consist merely of specialized hardware, such as one or more application-specific integrated circuits (ASICs). Hence, the features of the present invention described above may be implemented in hardware and/or software.

Exemplary UE

Figure 18:
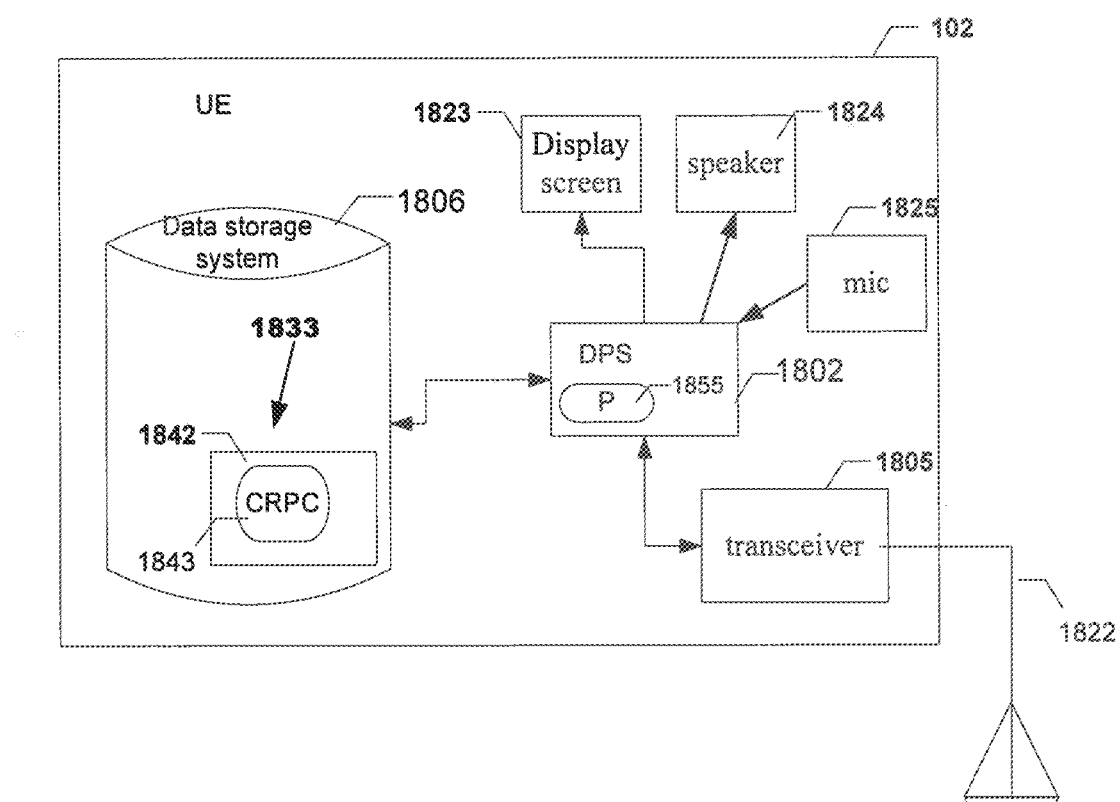
FIG. 18 illustrates a UE according to one embodiment of the present disclosure.

FIG. 18 illustrates a block diagram of an example UE 102. As shown in FIG. 18, UE 102 includes: a data processing system (DPS) 1802, which may include one or more processors (P) 1855 (e.g., microprocessors) and/or one or more circuits, such as an application specific integrated circuit (ASIC), Field-programmable gate arrays (FPGAs), etc.; a transceiver 1805, connected to an antenna 1822, for receiving messages from, and transmitting messages to, various access points; a data storage system 1806, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1802 includes a processor 1855 (e.g., a microprocessor), a computer program product 1833 may be provided, which computer program product includes: computer readable program code 1843 (e.g., instructions), which implements a computer program, stored on a computer readable medium 1842 of data storage system 1806, such as, but not limited, to magnetic media (e.g., a hard disk), optical media (e.g., a DVD), memory devices (e.g., random access memory), etc. In some embodiments, computer readable program code 1843 is configured such that, when executed by data processing system 1802, code 1843 causes the data processing system 1802 to perform steps described herein.

In some embodiments, UE 102 is configured to perform steps described above without the need for code 1843. For example, data processing system 1802 may consist merely of specialized hardware, such as one or more application-specific integrated circuits (ASICs). Hence, the features of the present invention described above may be implemented in hardware and/or software. For example, in some embodiments, the functional components of UE 102 described above may be implemented by data processing system 1802 executing program code 1843, by data processing system 1802 operating independent of any computer program code 1843, or by any suitable combination of hardware and/or software.

In a second embodiment, UE 102 further includes: 1) a display screen 1823 coupled to the data processing system 1902 that enables the data processing system 1802 to display information to a user of UE 130; 2) a speaker 1824 coupled to the data processing system 1802 that enables the data processing system 1802 to output audio to the user of UE 130; and 3) a microphone 1825 coupled to the data processing system 1802 that enables the data processing system 1802 to receive audio from the user.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of coordinating handover, comprising:
determining, at a first controller that is associated with a first radio access network (RAN) cell, a first handover parameter value that is for use in determining whether to cause handover from the first RAN cell to a second RAN cell having a different radio access technology (RAT) than the first RAN cell;
transmitting, from the first controller to a second controller that is associated with the second RAN cell, information relating to the first handover parameter value;
transmitting, from the first controller to the second controller, criteria information identifying a set of modes to which the first handover parameter value shall apply, wherein each mode in the set of modes identifies one or both of a quality of service (QoS) parameter value associated with the information and a user equipment (UE) capability parameter value associated with the information, wherein the QoS parameter value indicates a level of service provided to or expected by a user equipment (UE) being served by the first RAN cell or the second RAN cell, and wherein the UE capability parameter value indicates UE capability; and
receiving, from the second controller, an indication of whether the second controller has adjusted a second handover parameter value based on the transmitted information, wherein the second handover parameter value is for use in determining whether to cause handover from the second RAN cell to the first RAN cell.

2. The method of claim 1, wherein the first handover parameter value is a first handover threshold value, and the second handover parameter value is a second handover threshold value, wherein a handover occurs from the first RAN cell to the second RAN cell when a first calculated value exceeds the first handover threshold, and a handover occurs from the second RAN cell to the first RAN cell when a second calculated value exceeds the second handover threshold.

3. The method of claim 2, further comprising determining, by the first controller, an adjustment of the second handover threshold value based on the first handover threshold value, wherein the transmitted information includes the adjustment of the second handover threshold value, and wherein the received indication includes an indication of whether the second controller accepts the adjustment of the second handover threshold value.

4. The method of claim 3, further comprising:
in response to receiving an indication that the second controller does not accept the adjustment of the second handover threshold value, determining another value for the first handover threshold.

5. The method of claim 2, wherein the transmitted information includes the first handover threshold value, and wherein the received indication includes an indication of whether the second controller made an adjustment to the second handover threshold value based on the first handover threshold value.

6. The method of claim 5, further comprising:
in response to receiving an indication that the second controller has not made an adjustment to the second handover threshold value based on the first handover threshold value, determining another value for the first handover threshold.

7. The method of claim 1, wherein the transmitting steps comprise transmitting a RAN information management (RIM) message, and wherein the RIM message includes the information relating to the first handover parameter value, an identification of a QoS parameter associated with the QoS parameter value or a UE capability parameter associated with the UE capability parameter value, and the QoS parameter value associated with the information or the UE capability parameter value associated with the information.

8. The method of claim 7, wherein the second controller is one of a plurality of controllers of a plurality of RAN cells to which the RIM message is transmitted, the method further comprising transmitting, as part of the RIM message, a cell ID or cell group ID that identifies the second RAN cell.

9. The method of claim 1, wherein the QoS parameter value is associated with a signal bearer of data for the UE, the QoS parameter value including a value for at least one of: QoS class indicator (QCI) of the signal bearer, an allocation and retention priority (ARP) of the signal bearer, an indication of whether the signal bearer has a guaranteed bit rate (GBR), and an indication of whether the signal bearer is carrying real-time data.

10. The method of claim 1, wherein the UE capability parameter value includes a value for at least one of: a UE category, a UE radio resource management (RRM) configuration, a subscription type of the UE, and a velocity of the UE.

11. The method of claim 1, further comprising:
transmitting, from the first controller to the second controller, a request for one or more QoS parameter values or one or more UE capability parameter values that the second controller uses in determining handover;
receiving the one or more QoS parameter values or one or more UE capability parameter values; and
determining, at the first controller, the adjustment of the second handover parameter value based on the one or more QoS parameter values or one or more UE capability parameter values,
wherein the transmitted information includes the adjustment to the second parameter value, and
wherein the transmitted QoS parameter value or UE capability parameter value is one of the one or more received values.

12. The method of claim 1, further comprising:
transmitting, from the first controller to the second controller, one or more QoS parameter values or one or more UE capability parameter values that the first controller uses in determining handover; and
receiving, from the second controller, a request for one or more QoS parameter values or one or more UE capability parameter values that the second controller uses in determining handover.

13. The method of claim 12, further comprising:
changing, at the first controller, the one or more QoS parameter values or one or more UE capability parameter values that the first controller uses in determining handover; and
transmitting the change to the second controller.

14. The method of claim 12, further comprising:
changing, at the first controller, which QoS parameters or UE capability parameters the first controller uses in determining handover; and
transmitting the change to the second controller.

15. The method of claim 1, wherein the transmitting step comprises transmitting the UE capability parameter.

16. A first controller that is associated with a first radio access network (RAN) cell for coordinating handover with a second controller that is associated with a second RAN cell, the first controller comprising one or more processors configured to:
determine a first handover parameter value that is for use in determining whether to cause handover from the first RAN cell to the second RAN cell, wherein the second RAN cell has a different radio access technology (RAT) than the first RAN cell;

transmit, from the first controller to the second controller, information relating to the first handover parameter value;

transmit, from the first controller to the second controller, criteria information identifying a set of modes to which the first handover parameter value shall apply, wherein each mode in the set of modes identifies one or both of a quality of service (QoS) parameter value associated with the information and a user equipment (UE) capability parameter value associated with the information, wherein the QoS parameter value indicates a level of service provided to or expected by a user equipment (UE) being served by the first RAN cell or the second RAN cell, and wherein the UE capability parameter value indicates UE capability; and receive, from the second controller, an indication of whether the second controller has adjusted a second handover parameter value based on the transmitted information, wherein the second handover parameter value is for use in determining whether to cause handover from the second RAN cell to the first RAN cell.

17. The controller of claim 16, wherein the first handover parameter value is a first handover threshold value, and the second handover parameter value is a second handover threshold value, wherein a handover occurs from the first RAN cell to the second RAN cell when a first calculated value exceeds the first handover threshold, and a handover occurs from the second RAN cell to the first RAN cell when a second calculated value exceeds the second handover threshold.

18. The controller of claim 17, wherein the one or more processors are further configured to determine an adjustment of the second handover threshold value based on the first handover threshold value,
wherein the transmitted information includes the adjustment of the second handover threshold value, and
wherein the received indication includes an indication of whether the second controller accepts the adjustment of the second handover threshold value.

19. The controller of claim 18, wherein the one or more processors are further configured to:
in response to receiving an indication that the second controller does not accept the adjustment of the second handover threshold value, determine another value for the first handover threshold.

20. The controller of claim 17, wherein the transmitted information includes the first handover threshold value, and wherein the received indication includes an indication of whether the second controller made an adjustment to the second handover threshold value based on the first handover threshold value.

21. The controller of claim 20, wherein the one or more processors are further configured to:
in response to receiving an indication that the second controller has not made an adjustment to the second handover threshold value based on the first handover threshold value, determine another value for the first handover threshold.

22. The controller of claim 16, wherein the one or more processors are configured to transmit the information relating to the first handover parameter value and the QoS parameter value or the UE capability parameter value in a RAN information management (RIM) message.

23. The controller of claim 22, wherein the second controller is one of a plurality of controllers of a plurality of RAN cells to which the RIM message is transmitted, the one or more processors further configured to transmit, as part of the RIM message, a cell ID or cell group ID that identifies the second RAN cell.

24. The controller of claim 16, wherein the QoS parameter value is associated with a signal bearer of data for the UE, the QoS parameter value including a value for at least one of: QoS class indicator (QCI) of the signal bearer, an allocation and retention priority (ARP) of the signal bearer, an indication of whether the signal bearer has a guaranteed bit rate (GBR), and an indication of whether the signal bearer is carrying real-time data.

25. The controller of claim 16, wherein the UE capability parameter value includes a value for at least one of: a UE category, a UE radio resource management (RRM) configuration, a subscription type of the UE, and a velocity of the UE.

26. The controller of claim 16, wherein the one or more processors are further configured to:
transmit, from the first controller to the second controller, a request for one or more QoS parameter values or one or more UE capability parameter values that the second controller uses in determining handover;
receive the one or more QoS parameter values or one or more UE capability parameter values; and
determine, at the first controller, the adjustment of the second handover parameter value based on the one or more QoS parameter values or one or more UE capability parameter values,
wherein the transmitted information includes the adjustment to the second parameter value, and
wherein the transmitted QoS parameter value or UE capability parameter value is one of the one or more received values.

27. The controller of claim 16, wherein the one or more processors are further configured to:
transmit, from the first controller to the second controller, one or more QoS parameter values or one or more UE capability parameter values that the first controller uses in determining handover; and
receive, from the first controller to the second controller, a request for one or more QoS parameter values or one or more UE capability parameter values that the second controller uses in determining handover.

28. The controller of claim 27, wherein the one or more processors are further configured to:
change, at the first controller, the one or more QoS parameter values or one or more UE capability parameter values that the first controller uses in determining handover; and
transmit the change to the second controller.

29. The controller of claim 27, wherein the one or more processors are further configured to:
change, at the first controller, which QoS parameters or UE capability parameters the first controller uses in determining handover; and
transmit the change to the second controller.

* * * * *